US010486308B2

(12) United States Patent
Linnell et al.

(10) Patent No.: US 10,486,308 B2
(45) Date of Patent: Nov. 26, 2019

(54) SOFTWARE INTERFACE FOR AUTHORING ROBOTIC MANUFACTURING PROCESS

(71) Applicant: X Development LLC, Mountain View, CA (US)

(72) Inventors: Jeffrey Linnell, Woodside, CA (US); Kendra Byrne, San Francisco, CA (US); Matthew Bitterman, San Francisco, CA (US)

(73) Assignee: X Development LLC, Mountain View, CA (US)

( * ) Notice: Subject to any disclaimer, the term of this patent is extended or adjusted under 35 U.S.C. 154(b) by 235 days.

(21) Appl. No.: 15/616,096

(22) Filed: Jun. 7, 2017

(65) Prior Publication Data

US 2017/0266810 A1 Sep. 21, 2017

Related U.S. Application Data

(63) Continuation of application No. 14/242,828, filed on Apr. 1, 2014, now Pat. No. 9,701,018.

(51) Int. Cl.
*G06F 19/00* (2018.01)
*B25J 9/16* (2006.01)

(52) U.S. Cl.
CPC ... *B25J 9/1664* (2013.01); *G05B 2219/35216* (2013.01); *Y10S 901/41* (2013.01)

(58) Field of Classification Search
None
See application file for complete search history.

(56) References Cited

U.S. PATENT DOCUMENTS 5,511,147 A 4/1996 Abdel-Malek
5,950,006 A 9/1999 Crater et al.
(Continued)

FOREIGN PATENT DOCUMENTS

CN 102378943 3/2012
WO 2014/003864 1/2014

OTHER PUBLICATIONS

Bengtsson, K. et al., "Sequence Planning Using Multiple and Coordinated Sequences of Operations," IEEE Transactions on Automation Science and Engineering, 2012, pp. 308-319, vol. 9, No. 2.
(Continued)

*Primary Examiner* — Diem K Cao
(74) *Attorney, Agent, or Firm* — Fish & Richardson P.C.

(57) ABSTRACT

Example systems and methods allow for use of a graphical interface to cause one or more robotic devices to construct an output product. One example method includes causing a graphical interface to be displayed on a display device, receiving input data corresponding to one or more interactions with the graphical interface indicating at least one motion path and at least one sequence of tool actions to execute at one or more points within the at least one motion path for use in construction of an output product, generating a plurality of digital nodes including at least one robot node, at least one motion command node, and at least one tool command node, and providing instructions for the at least one robot actor to move according to the sequence of robot motion commands determined by the at least one motion command node and execute the sequence of tool commands determined by the at least one tool command node to construct the output product.

20 Claims, 17 Drawing Sheets

(56) References Cited

U.S. PATENT DOCUMENTS

| | | | |
|---|---|---|---|
| 6,161,051 | A | 12/2000 | Hafemann et al. |
| 6,522,951 | B2 | 2/2003 | Born et al. |
| 6,718,533 | B1 | 4/2004 | Schneider et al. |
| 7,298,385 | B2 | 11/2007 | Kazi et al. |
| 7,542,918 | B2 | 6/2009 | Rolleston Phillips |
| 7,590,680 | B2 | 9/2009 | Fernando et al. |
| 7,890,194 | B2 | 2/2011 | Pannese |
| 7,945,348 | B2 | 5/2011 | Pannese et al. |
| 8,073,567 | B2 | 12/2011 | Nishi et al. |
| 8,082,769 | B2 | 12/2011 | Butscher et al. |
| 8,229,587 | B2 | 7/2012 | Shieh et al. |
| 8,483,881 | B2 | 7/2013 | Ermakov et al. |
| 8,614,559 | B2 * | 12/2013 | Kassow ............... B25J 19/0004 318/568.11 |
| 8,639,666 | B2 | 1/2014 | Densham et al. |
| 8,660,738 | B2 | 2/2014 | Faivre et al. |
| 2001/0004718 | A1 | 6/2001 | Gilliland et al. |
| 2005/0119791 | A1 | 6/2005 | Nagashima |
| 2006/0145647 | A1 | 7/2006 | Kitatsuji et al. |
| 2006/0200254 | A1 | 9/2006 | Krause |
| 2006/0276934 | A1 | 12/2006 | Nihei et al. |
| 2008/0014058 | A1 | 1/2008 | Hongkham et al. |
| 2009/0112350 | A1 | 4/2009 | Yuan et al. |
| 2009/0144647 | A1 | 6/2009 | Chandhoke |
| 2009/0265036 | A1 * | 10/2009 | Jamieson ........... G05B 19/0426 700/259 |
| 2010/0312387 | A1 | 12/2010 | Jang et al. |
| 2010/0332017 | A1 | 12/2010 | Stummer |
| 2012/0072019 | A1 | 3/2012 | Sanders et al. |
| 2012/0188350 | A1 | 7/2012 | Hammond et al. |
| 2012/0215354 | A1 | 8/2012 | Krasny et al. |
| 2012/0307027 | A1 | 12/2012 | Popovic et al. |
| 2012/0317535 | A1 | 12/2012 | Schmirgel |
| 2013/0331959 | A1 | 12/2013 | Kawai |
| 2014/0097631 | A1 * | 4/2014 | Ciocarlie ................. B25J 15/08 294/198 |
| 2015/0094853 | A1 * | 4/2015 | Lee ........................ B25J 9/1602 700/250 |

OTHER PUBLICATIONS

Chen et al., "Simulation and Graphical Interface for Programming and Visualization of Sensor-based Robot Operation," Proceedings of the 1992 IEEE International Conference on Robotics and Automation, Nice, France, May 1992, pp. 1095-1110.

El-Hakim, "A system for indoor 3-d mapping and virtual environments," Proceedings of the SPIE—The International Society for Optical Engineering, 1997, pp. 21-35, vol. 3174.

Li et al., "Fuzzy Target Tracking Control of Autonomous Mobile Robots by Using Infrared Sensors," IEEE Transactions on Fuzzy Systems, Aug. 2004, pp. 491-501, vol. 12, No. 4.

Roll Jr. et al., "Targeting and sequencing algorithms for the Hectospec's optical fiber robotic positioner," Proceeding of the SPIE—The International Society for Optical Engineering, 1998, pp. 324-332, vol. 3355.

Sanhoury et al., "Switching between formations for multiple mobile robots via synchronous controller," 2012 IEEE 8th International Colloquium on Signal Processing and its Applications (CSPA), 2012, pp. 352-357.

Zhang, Peng, "Chapter 3—System Interfaces for Industrial Control," Industrial Control Technology: A Handbook for Engineers and Researchers, 2008, pp. 259-427.

PCT International Search Report; International application No. PCT/US2015/0233358; International filing date Mar. 30, 2015;(3 pages).

Grasshopper [online], available online on or before May 19, 2009, [retrieved on Aug. 17, 2017] Retrieved from the Internet: URL (2009 version): <https://web.archive.org/web/20090519001653/http://www.grasshopper3d.com/> (2017 version): <http://www.grasshopper3d.com/>, 20 total pages.

International Preliminary Report on Patentability issued in International Application No. PCT/US2015023358, dated Oct. 13, 2016, 7 pages.

Rhinoceros [online], available online on or before Dec. 23, 1996, [retrieved on Aug. 17, 2017] Retrieved from the Internet: URL (1996 version): <https://web.archive.org/web/19961223083529/https://www.rhino3d.com/> (2017 version): <https://www.rhino3d.com/>, 4 total pages.

Wikipedia [online], "Grasshopper 3D," last updated Aug. 12, 2017, [retrieved on Aug. 17, 2017], Retrieved from the Internet: URL<https://en.wikipedia.org/wiki/Grasshopper_3D>, 5 pages.

Wikipedia [online], "Rhinoceros 3D," last updated Jun. 26, 2017, [retrieved on Aug. 17, 2017], Retrieved from the Internet: URL<https://en.wikipedia.org/wiki/Rhinoceros_3D>, 6 pages.

CN Office Action in Chinese Appln. 201580027799.6, dated Feb. 20, 2019, 10 pages (with English translation).

* cited by examiner

SOFTWARE INTERFACE FOR AUTHORING ROBOTIC MANUFACTURING PROCESS

CROSS-REFERENCE TO RELATED APPLICATION

The present disclosure is a continuation of U.S. patent application Ser. No. 14/242,828, filed on Apr. 1, 2014, and entitled "Software Interface for Authoring Robotic Manufacturing Process," the entire contents of which are herein incorporated by reference as if fully set forth in this description.

BACKGROUND

Automated manufacturing processes may involve the use of one or more robotic devices that may be used to construct an output product, such as a car, a wall, a piece of furniture, or any number of other physical fabrications. The robotic devices may be equipped with end-effector-mounted tools, such as a gripper or a drill, that may be used during a construction process. The robotic devices may be programmed with sequences of specific motion commands and commands for other operations in order to cause the robotic devices to complete a manufacturing process.

SUMMARY

The present disclosure provides methods and apparatuses that allow for use of a graphical interface in order to cause one or more robotic devices to construct an output product. In particular, using a graphical interface, input data specifying at least one motion path and at least one sequence of tool actions to occur at points within the motion path may be received. Then, based on node configuration data, a number of different digital nodes may be generated within a display window. The digital nodes may include at least one robot node describing a robot actor. The digital nodes may also include at least one motion command node that determines robot motion commands and at least one tool command node that determines tool commands based on received input data. The at least one robotic device may then execute motion commands determined by the at least one motion command node and execute tool commands determined by the at least one tool command node in order to construct the output product.

In one example, a method is provided that includes causing a graphical interface to be displayed on a display device. The method may further include receiving input data corresponding to one or more interactions with the graphical interface, where the input data indicates at least one motion path and at least one sequence of tool actions to execute at one or more points within the at least one motion path for use in construction of an output product, and where in the put data further indicates node configuration data. The method may additionally include generating, based on the node configuration data, a plurality of digital nodes. The plurality of digital nodes may include (a) at least one robot node describing one or more attributes of at least one robot actor, (b) at least one motion command node that determines a sequence of robot motion commands to cause the at least one robot actor to move along the at least one motion path, and (c) at least one tool command node that determines a sequence of tool commands to cause the at least one robot actor to operate at least one tool according to the at least one sequence of tool actions. The method may further include providing instructions for the at least one robot actor to move according to the sequence of robot motion commands determined by the at least one motion command node and execute the sequence of tool commands determined by the at least one tool command node to construct the output product.

In a further example, a system including at least one robot actor and a control system is disclosed. The control system may be configured to cause a graphical interface to be displayed on a display device. The control system may be further configured to receive input data corresponding to one or more interactions with the graphical interface, where the input data indicates at least one construction path for use by the at least one robot actor, where the at least one construction path comprises at least one sequence of robot operations, where at least some of the robot operations comprise use of at least one tool, and where the input data further indicates node configuration data. The control system may additionally be configured to generate, based on the node configuration data, a plurality of digital nodes. The digital nodes may include (a) at least one robot node describing one or more attributes of a corresponding one of the at least one robot actor and (b) at least one command node that determines a sequence of robot commands to cause a robot actor corresponding to the at least one robot node to perform the at least one sequence of robot operations within the at least one construction path. The control system may also be configured to provide instructions for the at least one robot actor to execute the sequence of robot commands determined by the at least one command node.

In another example, a non-transitory computer readable medium having stored therein instructions, that when executed by a computing system, cause the computing system to perform functions is disclosed. The functions may include causing a graphical interface to be displayed on a display device. The functions may further include receiving input data corresponding to one or more interactions with the graphical interface, where the input data indicates at least one motion path and at least one sequence of tool actions to execute at one or more points within the at least one motion path for use in construction of an output product, and where in the put data further indicates node configuration data. The functions may additionally include generating, based on the node configuration data, a plurality of digital nodes. The plurality of digital nodes may include (a) at least one robot node describing one or more attributes of at least one robot actor, (b) at least one motion command node that determines a sequence of robot motion commands to cause the at least one robot actor to move along the at least one motion path, and (c) at least one tool command node that determines a sequence of tool commands to cause the at least one robot actor to operate at least one tool according to the at least one sequence of tool actions. The functions may further include providing instructions for the at least one robot actor to move according to the sequence of robot motion commands determined by the at least one motion command node and execute the sequence of tool commands determined by the at least one tool command node to construct the output product.

In yet another example, a system may include means for causing a graphical interface to be displayed on a display device. The system may further include means for receiving input data corresponding to one or more interactions with the graphical interface, where the input data indicates at least one motion path and at least one sequence of tool actions to execute at one or more points within the at least one motion path for use in construction of an output product, and where in the put data further indicates node configuration data. The system may additionally include means for generating, based on the node configuration data, a plurality of digital nodes. The plurality of digital nodes may include (a) at least one robot node describing one or more attributes of at least one robot actor, (b) at least one motion command node that determines a sequence of robot motion commands to cause the at least one robot actor to move along the at least one motion path, and (c) at least one tool command node that determines a sequence of tool commands to cause the at least one robot actor to operate at least one tool according to the at least one sequence of tool actions. The system may further include means for providing instructions for the at least one robot actor to move according to the sequence of robot motion commands determined by the at least one motion command node and execute the sequence of tool commands determined by the at least one tool command node to construct the output product.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1:
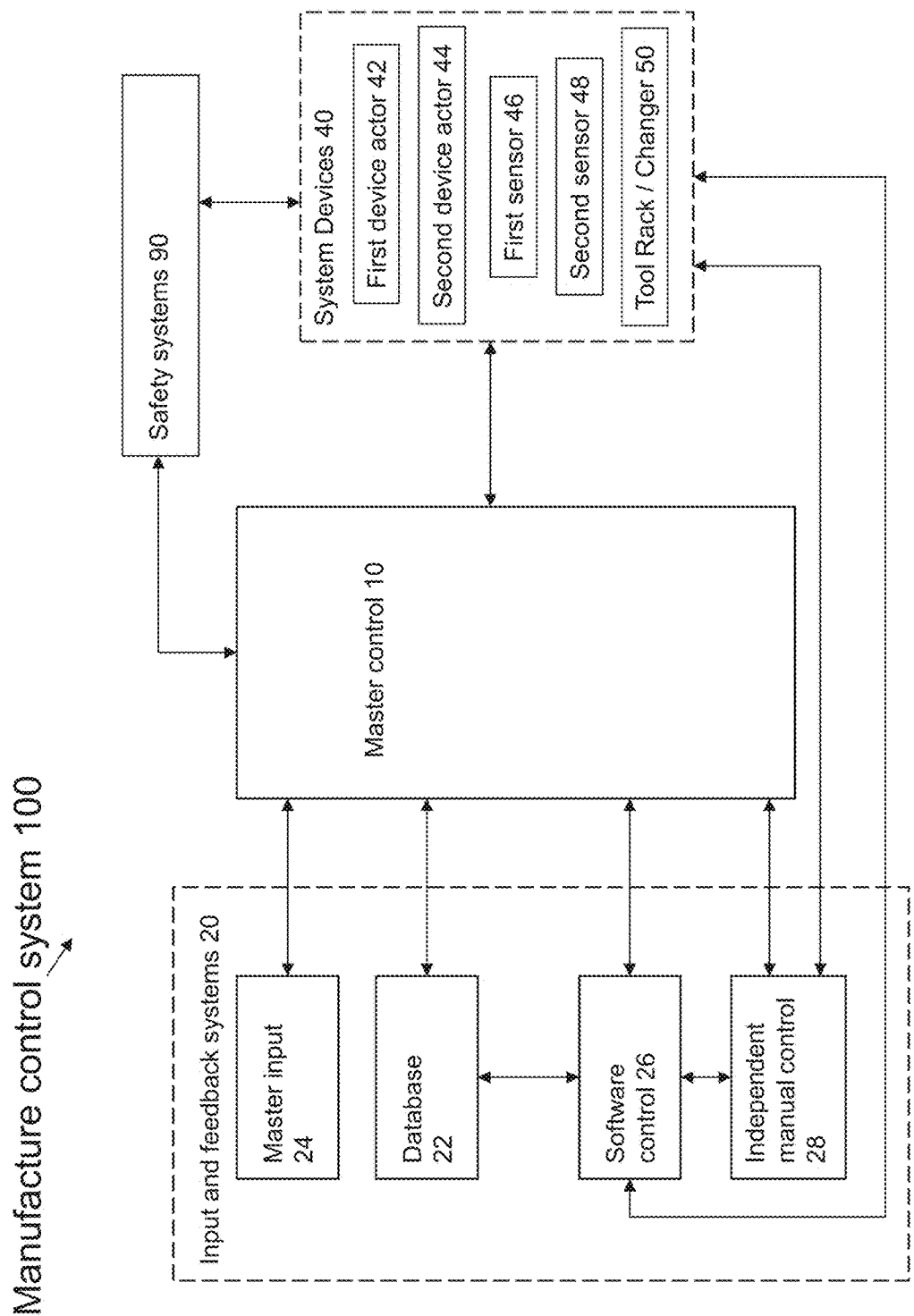
FIG. 1 shows a block diagram of a manufacture control system, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

I. Overview

Example embodiments provide for a graphical interface that allows a user to configure one or more robotic devices in order to author a manufacturing process using the robotic devices. In particular, a user may be able to select and configure digital nodes via the graphical interface describing robot actors and other aspects of a physical workcell in order to control a building process in the physical world. Additionally, the graphical interface may provide a layer of abstraction so that users may input motion paths and tool operations for robotic devices without having to specify particular robot commands.

In some examples, robotic devices may be represented within a graphical interface as digital robot nodes describing one or more attributes of robotic actors within a physical workcell. In further examples, digital robot actors may include a number of interchangeable component nodes. For instance, a component node may include a robot node representing different makes and models of commercial robots, along with different limitations (e.g., ranges of motion) of particular robotic devices. In further examples, a component node may include a tool node representing different types of tools that may be used by a particular robotic device during construction, such as grippers or spindles. In yet further examples, a component node may include an input/output (IO) node representing types or ranges of data input or output available to communicate with a particular robotic device. In additional examples, a component node may also include a track node representing different tracks of motion that a robot can move along within the physical workcell. Other component nodes are also possible.

In further examples, the graphical interface may enable a user to configure a stage node describing all of the available robot actors, tools, IO types, and/or axes of motion within a physical workcell. The robot actors may include robots from a variety of different types and manufacturers. The construction tools may include a number of different tools usable by a robotic device in a building process, such as a gripper, spindle, or welding iron. In additional examples, users may configure the stage node to indicate which components such as robot actors or construction tools are currently available within a particular physical workcell for a building process.

In some examples, users may also be able to select one or more motion command nodes which determine sequences of robot motion commands for one of the robot actors to follow based on inputted motion paths. In particular, a motion command node may determine robot commands for a particular robot actor in the stage that move the robot's end effector through a sequence of frames (positions and orientations) that correspond to an inputted motion path. For instance, a motion command node may determine a sequence of joint angles and/or joint movements that cause a robot actor to follow a particular motion path. In further examples, a graphical interface may contain an interpolation slider that may be used to determine an interval at which robot motion commands are determined along the motion path.

In some examples, some or all of the motion paths may be determined based on input geometry. For instance, a motion path for a robot actor to follow (e.g., a sequence of positions and orientations through space) may be determined based on mathematically derived planes from parameters describing a desired output product. In some examples, one or more endpoints for one or more of the motion paths may be determined using target planes on the output product. In further examples, the graphical interface may provide a user with endpoints of motion paths and allow the user to adjust portions of the motion path between the endpoints.

In further examples, users may be able to select one or more tool command nodes that indicate certain tool actions (e.g., open a gripper) for one of the robot actors to take in order to construct the output product. The tool command nodes may determine a sequence of tool commands that cause a particular robot actor to execute the inputted tool actions. In particular, a tool command node may allow the user to configure a sequence of particular tool actions (e.g., pick up a stick, hold a stick, put down a stick, nail a stick, etc.) for the robotic device to take at certain points along its determined motion path in order to construct the output product.

In an alternative embodiment, command nodes may be used to determine both motion commands and tool commands for robot actors. For instance, a construction path may be determined based on data received through a graphical interface for a particular robot actor. The construction path may indicate sequences of robot operations for the robot actor o take, which may include both motions and tool operations within a single construct. A command node may then determine robot operations for a particular robot actor to execute based on a received construction path. Other configurations are also possible.

In additional examples, the set of motion commands and the set of tool commands determined by a motion command node and a tool command node may be paired up to create a step node that includes a sequence of movements and tool actions for a robot to follow to complete some action during construction (e.g., move to a stick and pick up the stick). In further examples, export nodes may be used to export steps to a particular robot actor in order to cause the robot actor to execute the movements and tool actions within a physical workcell. In some examples, these step nodes may be reusable building blocks within the graphical interface that allow for sequencing more complex sequences of motion. In further examples, sync nodes may be used to cause commands from two or more step nodes to start at the same time, which may allow for multiple robotic devices to work in parallel.

II. Example Control Systems

Example embodiments may provide for motion planning and control of multi-axis robotic systems for use in the manufacturing and making industries. Example design-to-production systems may allow users to change parameters describing an output product on the front end, with the effects propagated through to a product manufactured by one or more robotic devices using one or more tools. In some examples, users may be provided with a graphical interface that allows for the configuration of the robot actors using a diverse toolset in order to automate the building process. In further examples, robot motions may be abstracted so that users don't have to program specific robot commands (e.g., motion commands or tool commands) in order to control the building process. Accordingly, users may be able to design a building process without specific knowledge of commands for particular types of robots. Additionally, users may be provided with one or more interfaces that allow for varying amounts of control over specific robot operations within a manufacturing process, during offline motion programming and/or during runtime, In further examples, users may be provided with a three-dimensional (3D) modeling graphical interface that allows the user to alter one or more variables describing a physical workcell and/or a desired output product that affect a building process in the physical world. Additionally, the user interface may provide abstract ways to represent physical objects digitally as nodes within a software environment. In particular, the user experience may enable users to select from an array of tools which can be configured and combined in a number of different ways to control different types of robot actors and hardware components within a physical workcell.

In further examples, the physical workcell may include a physical stage or stages on which a physical building process is planned or is occurring within the physical world. In some examples, the physical workcell may include a variety of different robot actors and other hardware components as well as physical materials that may be used in the building process. In further examples, the physical workcell may contain a tool rack and/or an automated tool changer. In additional examples, the physical workcell may contain one or more different types of sensors. Also, the physical workcell may include any number of different dimensions, including platforms for particular building activities.

It should be understood that the present disclosure is not to be limited in terms of the particular embodiments described in this application, which are intended as illustrations of various aspects. Numerous components of example manufacturing systems are described herein. Systems that contain only some of those components or any combination of such components are contemplated as well. Many modifications and variations can be made without departing from the spirit and scope of the disclosed systems and methods. Functionally equivalent methods and apparatuses within the scope of the disclosure, in addition to those enumerated herein, will be apparent to those skilled in the art.

Example embodiments may involve use of a manufacture control system to create automated programming of robotics arms during a building process. FIG. 1 describes an example manufacture control system 100. Manufacture control system 100 may be part of a manufacturing environment used to control one or more robotic devices to use one or more tools to construct some output product. Manufacture control system 100 may comprise a master control 10, input and feedback systems 20, system devices 40, and safety systems 90. From the most basic perspective, manufacture control system 100 may function when an input system 20 provides instructions to one of system devices 40 via master control 10.

In one potential embodiment as part of a manufacture control system 100, input and feedback systems 20 may include a database 22, a master input 24, a software control 26, and an independent manual control 28. As part of the input and feedback systems 20, database 22 may operate to provide a set of timing and position data to direct all or a portion of device actors 42, 44 within system devices 40. Two device actors 42, 44 are shown in FIG. 1, but any number of device actors could be used within manufacture control system 100. Alternatively, database 22 may store data being created by manual or individual movement or data input related to operation and function of device actors 42, 44. Database 22 may also store data created independently of device actors 42, 44, such as data created using software modeling features of a software control 26.

A master input 24 may be any device that functions to operate all of the device actors 42, 44 associated with a particular building process being executed by manufacture control system 100. Master input 24 may function by sending input control signals to master control 10. Master control 10 may then adapt the signal from master input 24 to send individual control signals to a plurality of robot actors operating as device actors 42, 44 for a particular manufacturing process. In one potential embodiment, every individual device of device actors 42, 44 may be provided a control signal from master control 10 when a signal is received from master input 24, including a signal to maintain a status quo or non-action to devices that are not operating as device actors 42, 44 for a particular part of the manufacturing process. In an alternative embodiment, a portion of the device actors 42, 44 connected as part of manufacture control system 100 may not be sent any signal from master control 10 as part of the operation of motion control system 100 for a particular part of the manufacturing process.

In some examples, software control 26 may act as a replacement for master input 24 in sending control signals to the plurality of device actors 42, 44 via the master control 10. Alternately, software control 26 may control individual devices from among device actors 42, 44 to control particular operations of the individual device. In other potential embodiments, software control 26 may function to model the behavior of individual devices of device actors 42, 44 within a virtual modeling environment representative of a physical workcell. In such an embodiment, software control 26 may contain a software model for an individual device, which allows control signals to be created for the device without actually sending the control signals to the device. The control signals may then be stored in the software control 26, in database 22, within a computer memory component that is part of master control 10, or within computer memory that is part of the device of device actors 42, 44 for which the controls are being created. After the control signal is created by software control 26 and propagated to the appropriate storage location, a master control signal from software control 26 or from master input 24 may activate the control signal for the individual device to act in conjunction with other device actors 42, 44.

In further examples, certain devices of device actors 42, 44 may additionally have an independent manual control 28. As described above with respect to software control 26, control signals for an individual device may be created in software modeling. In addition or instead, a device may have independent manual control 28 that may be used to operate a device of device actors 42, 44. When a set of instructions is being created for an entire manufacturing process, the independent manual control 28 may be given input commands over time that are recorded to database 22 or a memory device of master control 10. During creation of a set of instructions using independent manual control 28, the independent manual control 28 may communicate directly with the associated device of device actors 42, 44. Alternatively, the independent manual control 28 may send a control signal to master control 10, which then conveys the signal to the associated device of device actors 42, 44.

The control signal may then be created either from the signal of the independent manual control 28 (e.g., a separate user interface), or from a measured feedback reading created by the operation of the associated device. Additionally, although in many situations, it may be preferable to have the independent manual control 28 actually control the associated device during control signal creation in real time, control signals may instead be created without controlling the device. For example, if input signals are expected for certain time marks, an independent manual control 28 may be operated independent of the related device, and the control operation may be recorded. Accordingly, instructions for individual device actors of device actors 42, 44 from independent manual control may be integrated into a building process as part of manufacture control system 100.

In further examples, master control 10 may allow for real-time control of components of a building system by providing a link between a virtual world (e.g., software control 26) and the physical world (e.g., a physical workcell containing device actors 42, 44). Accordingly, movements of a physical robot within the physical world may be used to drive the current position of a corresponding virtual robot n real time. Similarly, movements of a virtual robot may be used to drive the current position of a physical robot in the physical world as well or instead.

In one potential embodiment, individual control signals for specific device actors may be coordinated into a single file within a memory of a master control with a common base time provided by a master clock within the master control. During operation, the master control may extract control signals for each device actor and provide individual control signals to each device actor at the appropriate intervals. In an alternative embodiment, the master control may maintain separate individual control signal files and timing data for different device actors, and synchronize the different control signals separately from the individual control files.

In another alternative embodiment, the control data for a portion of the device actors may be transferred by a master control to a memory within an associated individual device actor. During operation, device actors having control data within memory may receive a synchronization signal that indicates a location in a global timeline, a rate of progress through a global timeline, or both.

Network support may also enable communications from master control 10 to one or more of system devices 40. In one potential embodiment, a network may comprise an EtherCAT network operating according to IEEE 1588. In such an embodiment, packets may be processed on the fly using a field bus memory management unit in each slave node. Each network node may read the data addressed to it, while the telegram is forwarded to the next device. Similarly, input data may be inserted while the telegram passes through. The telegrams may only be delayed by a few nanoseconds. On the master side, commercially available standard network interface cards or an on-board Ethernet controller can be used as a hardware interface. Using these interfaces, data transfer to the master control via direct memory access may be achieved with no CPU capacity taken up for the network access. The EtherCAT protocol uses an officially assigned Ether Type inside the Ethernet Frame. The use of this Ether Type may allow transport of control data directly within the Ethernet frame without redefining the standard Ethernet frame. The frame may consist of several sub-telegrams, each serving a particular memory area of the logical process images that can be up to 4 gigabytes in size. Addressing of the Ethernet terminals can be in any order because the data sequence may be independent of the physical order. Broadcast, multicast, and communication between slaves are possible.

Transfer directly in the Ethernet frame may be used in cases where EtherCAT components are operated in the same subnet as the master controller and where the control software has direct access to the Ethernet controller. Wiring flexibility in EtherCAT may be further maximized through the choice of different cables. Flexible and inexpensive standard Ethernet patch cables transfer the signals optionally in Ethernet mode (100BASE-TX) or in E-Bus (LVDS) signal representation. Plastic optical fiber (POF) can be used in special applications for longer distances. The complete bandwidth of the Ethernet network, such as different fiber optics and copper cables, can be used in combination with switches or media converters. Fast Ethernet (100BASE-FX) or E-Bus can be selected based on distance requirements.

Further, such an embodiment using EtherCAT supports an approach for synchronization with accurate alignment of distributed clocks, as described in the IEEE 1588 standard. In contrast to fully synchronous communication, where synchronization quality suffers immediately in the event of a communication fault, distributed aligned clocks have a high degree of tolerance from possible fault-related delays within the communication system. Thus, data exchange may be completely done in hardware based on "mother" and "daughter" clocks. Each clock can simply and accurately determine the other clocks' run-time offset because the communication utilizes a logical and full-duplex Ethernet physical ring structure. The distributed clocks may be adjusted based on this value, which means that a very precise network-wide time base with a jitter of significantly less than 1 microsecond may be available.

However, high-resolution distributed clocks are not only used for synchronization, but can also provide accurate information about the local timing of the data acquisition. For example, controls frequently calculate velocities from sequentially measured positions. Particularly with very short sampling times, even a small temporal jitter in the displacement measurement may lead to large step changes in velocity. In an embodiment comprising EtherCAT, the EtherCAT expanded data types (timestamp data type, oversampling data type) may be introduced. The local time may be linked to the measured value with a resolution of up to 10 ns, which is made possible by the large bandwidth offered by Ethernet. The accuracy of a velocity calculation may then no longer depend on the jitter of the communication system.

Further, in an embodiment where a network comprises EtherCAT, a hot connect function may enable parts of the network to be linked and decoupled or reconfigured "on the fly". Many applications require a change in I/O configuration during operation. The protocol structure of the EtherCAT system may take account these changing configurations.

In further examples, safety systems 90 may be provided for preventative safety in detecting potential collisions between device actors in modeling the motion of the actors through a global timeline. Further, such modeling through a global timeline may be used to set safety parameters for safety systems 90. Modeling of locations and velocities of device actors through a global timeline may enable identification of unsafe zones and unsafe times in an area of a physical workcell. Such an identification may be used to set sensing triggers of object detectors that are part of an example safety system. For example, if an area within 5 feet of a certain device actor is determined to be at risk of collision, and a buffer zone of 10 additional feet is required to insure safety during operation, a LIDAR detector may be configured to detect unexpected objects and movement within a 15 foot area of the device actor during operation, and to automatically create a safety shutdown if an object is detected. In an alternative embodiment, the LIDAR detector may be configured to create a warning signal if an object is detected in a periphery of the danger zone, and only to create a shutdown if the detected object is moving toward a potential impact zone.

In an alternate embodiment, safety systems 90 may include modeling of actors and models of defined safe zones. Analysis of the motion of the actors in software control may allow a modeled safety check to see if any actor collides with a defined safe zone. In some examples, safe zones may be defined by entry of fixed volumes of space into a software control, by image capture of a physical workcell. Safe zones may also be defined to be variable based on a detected motion, jerk, velocity, or acceleration of an object in a safe zone. In an alternate embodiment, a safe zone may be defined by input from transponder device data. For example, a transponder location device may be attached to a robotic device actor, and a safe zone defined by a distance from the transponder. The transponder may feed location data to software control, which may update safe zones within a software control or within a master safety control. In another embodiment, fixed safe zones may be defined within software control, and published prior to a safety PLC within a master safety control prior to operation of a building process.

In some examples, system devices 40 may additionally include one or more sensors 46 and 48, such as laser-based, infrared, or computer vision-based sensors. Master control 10 may stream data in from one or more different types of sensors located within the physical workcell. For instance, data from the sensors may reflect dimensions or other properties of parts and/or materials within a physical workcell, as well as how the parts and/or materials are currently positioned within the real world. This data may then be streamed out to one or more robotic device actors 42 and 44 within the environment to control robotic actions, such as to accurately define a pick-up point or to adjust the pressure applied to a particular material to avoid damaging the material.

In further examples, robotic device actor 42, 44 may be configurable to operate one or more tools for use in construction, such as spindles, grippers, drills, pincers, or welding irons. In some examples, robotic device actors 42, 44 may be able to switch between one or more tools during a building process using a tool rack and/or automated tool changer 50. For instance, master control 10 may contain programming logic in order to automate the selection and equipping of tools from tool rack 50. In other examples, instructions to cause one of the robotic device actors 42, 44 to change tools using the tool rack/tool changer 50 may come from independent manual control 28 as well or instead.

II. Example System Devices

Referring now to FIGS. 2A-2C and 3A-C, several non-limiting examples of system devices 40, including robotic device actors 42, 44 and a tool rack/tool changer 50 will be described. Although these figures focus on the use of robotic arms, other types of device actors 42, 44 or system devices 40 may be used in some examples as well or instead.

Figure 2A:
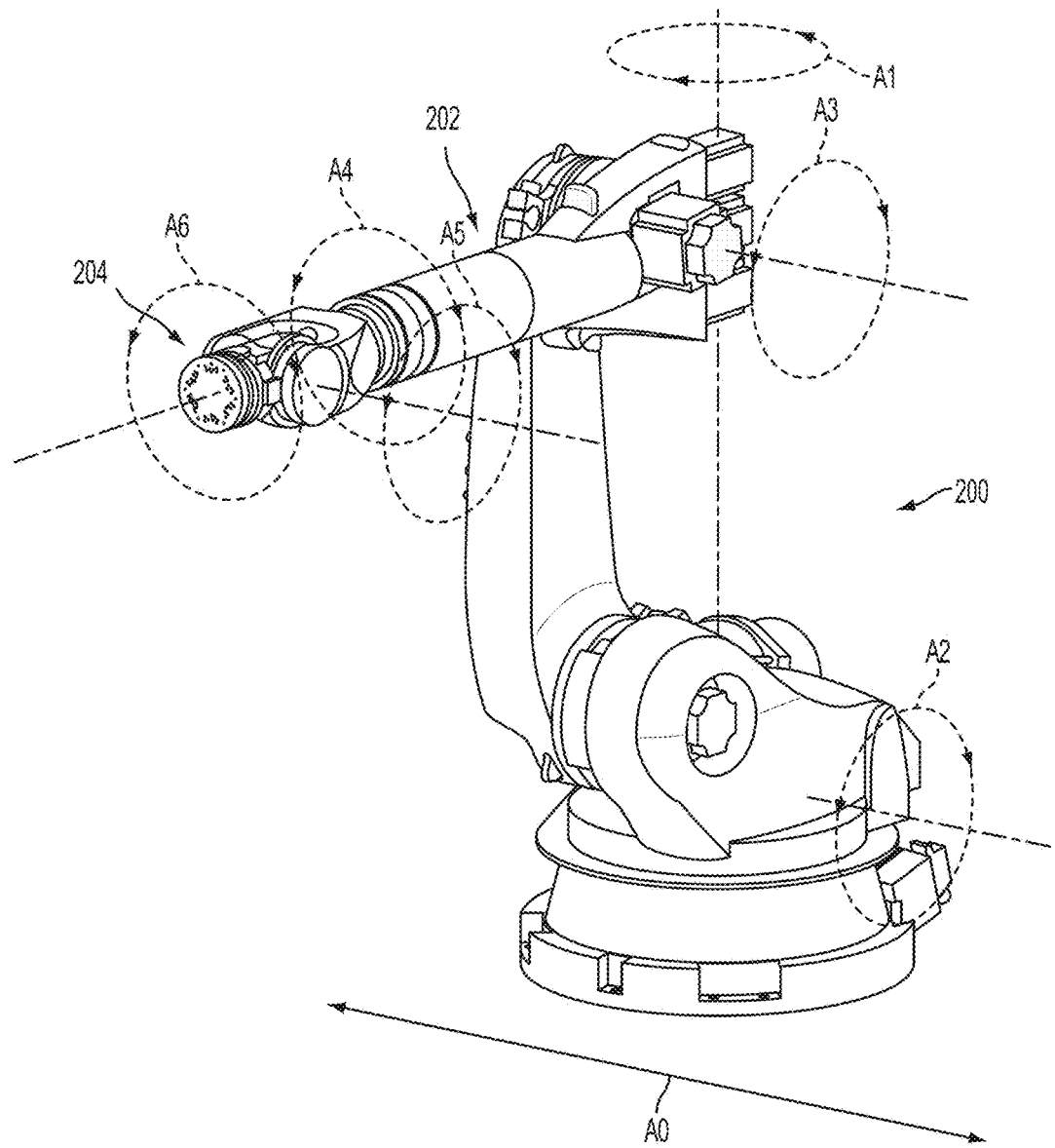
FIG. 2A shows a view of a robot with 7 degrees of freedom, according to an example embodiment.

FIG. 2A illustrates a robotic device actor, according to an example embodiment. In particular, robotic device actor 200 may include a robotic arm 202 with an end effector 204 capable of being equipped with one or more different tools. The robotic arm 202 may be capable of motion along six degrees of freedom, depicted in FIG. 2A as A1-A6. In certain examples, robotic device actor 200 may be further capable of motion along one or more axes A0, such as along a rail which is not shown that allows side to side movement. In certain embodiments, instructions may be given to position end effector 204 at a specific location, and the positions of the robotic arm 204 along A1-A6 and/or of robotic device actor 200 along one or more axes A0 may be calculated by a process of the related manufacture control system. In alternative embodiments, position control of robotic device actor 200 and/or robotic arm 202 may require separate, individual settings and control commands. Robotic devices operating with fewer degrees of freedom may be used in some examples as well or instead.

Figure 2B:
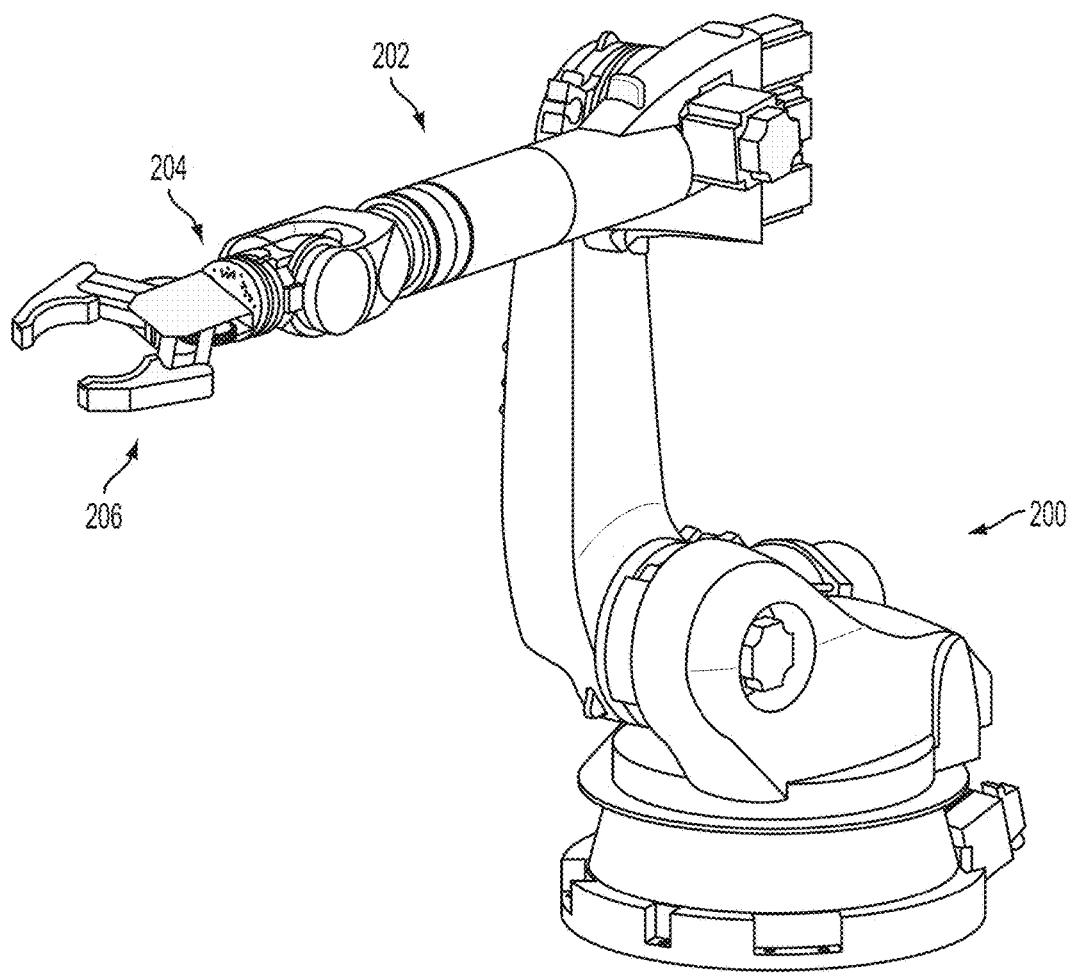
FIG. 2B shows a view of a robot with an attached gripper, according to an example embodiment.

FIG. 2B illustrates robotic device actor 200 equipped with a gripper 206. In particular, the gripper 206 may be placed at end effector 204 of the robotic arm 202. The gripper 206 may be used for various functions during a building process, such as picking up objects or parts, moving objects or parts, holding objects or parts, and/or placing objects or parts. A variety of different types of grippers may be used, such as a vacuum gripper, a tumble gripper, or a passive centering gripper. Additionally, grippers with different dimensions or other properties may be used, possibly to coincide with different types of robot actors within a physical workcell.

Figure 2C:
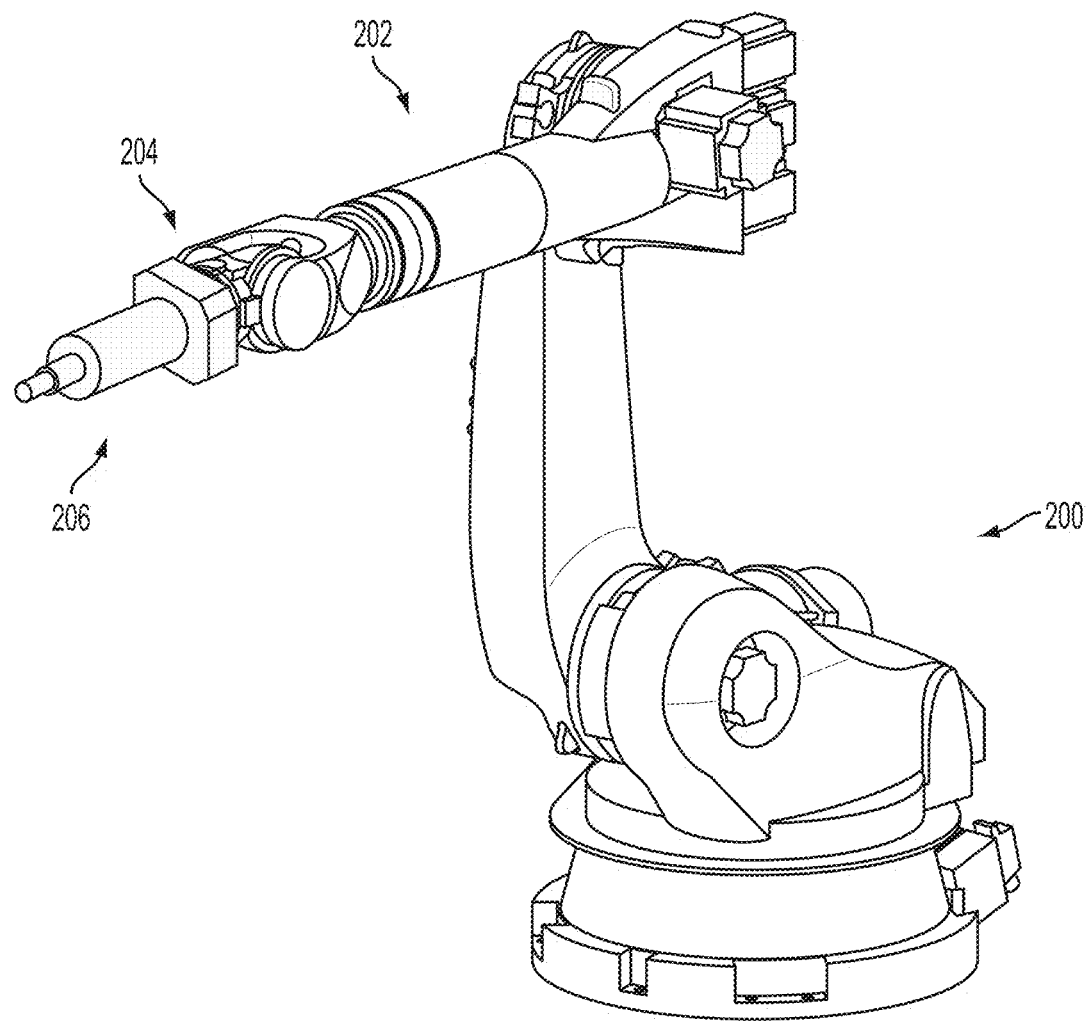
FIG. 2C shows a view of a robot with an attached spindle, according to an example embodiment.

FIG. 2C illustrates robotic device actor 200 equipped with a spindle 208. A spindle 208 may include a rotating axis for use in various functions within a building process, such as cutting materials, shaping materials, milling or routing. The spindle 208 could be a variety of different types, such as a grinding spindle, an electric spindle, a low-speed spindle, or a high-speed spindle. Additionally, spindles with different dimensions or other properties may be used, depending on the different types of robot actors within a physical workcell. In some examples, other types of tools may be used by robotic device actors as well or instead.

Figure 3A:
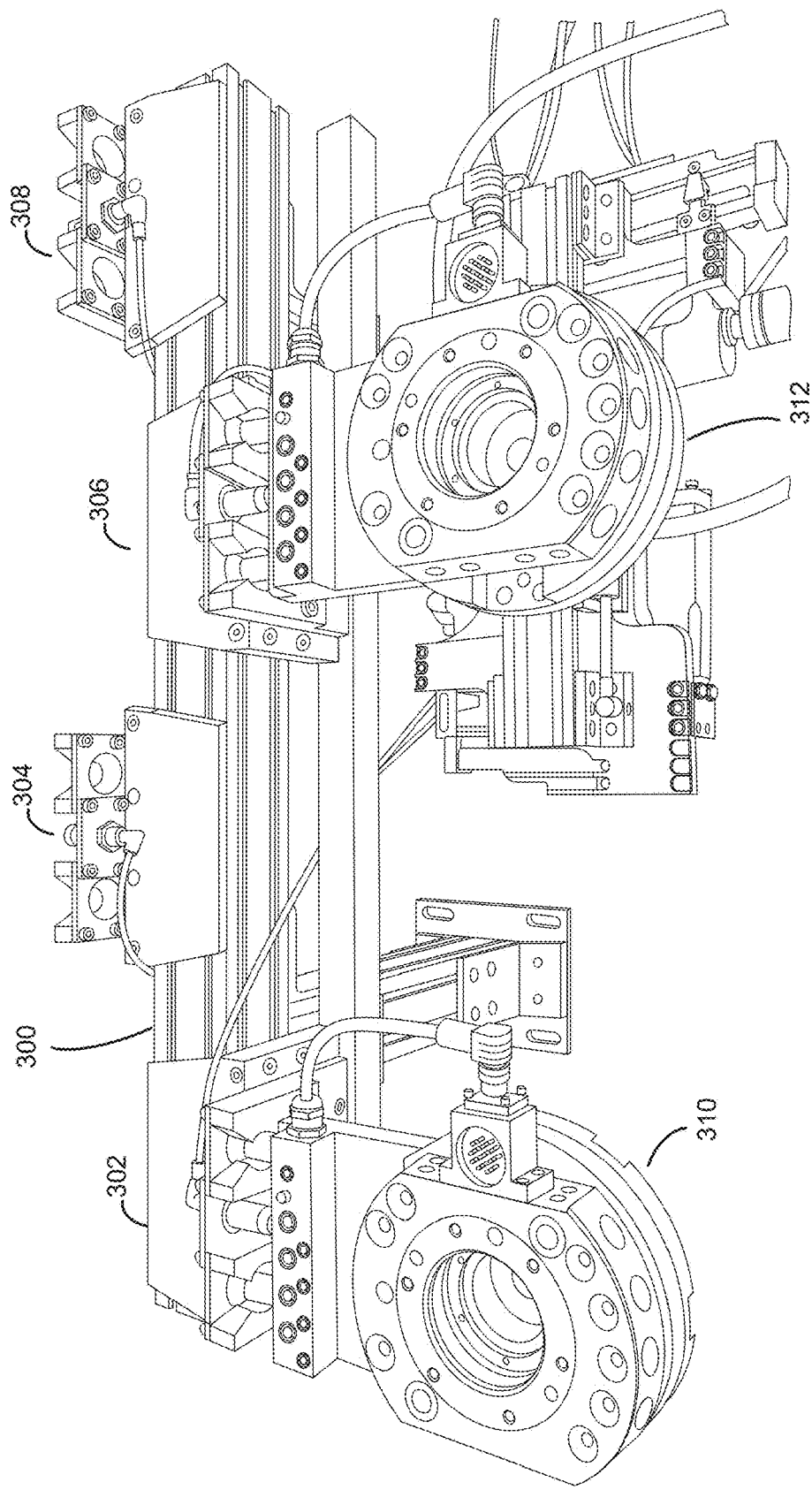
FIG. 3A shows a view of a tool rack, according to an example embodiment.

FIG. 3A illustrates a tool rack, according to an example embodiment. The tool rack may contain a number of different fabrication tools (e.g., spindles or grippers) and may be used along with an automated tool changer in order to equip robotic devices with particular tools to use within a physical workcell. In some examples, the tool rack may contain several tool rack modules 302, 304, 306, 308 positioned along a track 300, with each of the tool rack modules 302, 304, 306, 308 containing one or more particular tools. In some examples, one or more of the tool rack modules 302, 304, 306, 308 may be moveable along the track 300. In further examples, a tool rack module may be capable of interfacing with a slave module that allows for a particular tool to be selected from the tool rack module and then equipped onto a robotic device. For instance, referring to FIG. 3A, tool rack module 302 may interface with slave module 310 and tool rack module 306 may interface with slave module 312.

In order to facilitate tool changing, the tool rack modules may be equipped with built-in safety sensors to minimize the risk of accidental tool fetch and drop commands. Additionally, the tool change slave modules may include IO breakout boxes to simplify passing IO trigger signals to control tools. In some examples, the IO breakout boxes may interface with a timing control system, such as master control 10 described with respect to FIG. 1, that controls the robotic devices within a physical workcell. Master control 10 may be used to direct a tool change for a particular robotic device, which may be configured in advance using software control 26 and/or from independent manual control 28 during runtime.

Figure 3B:
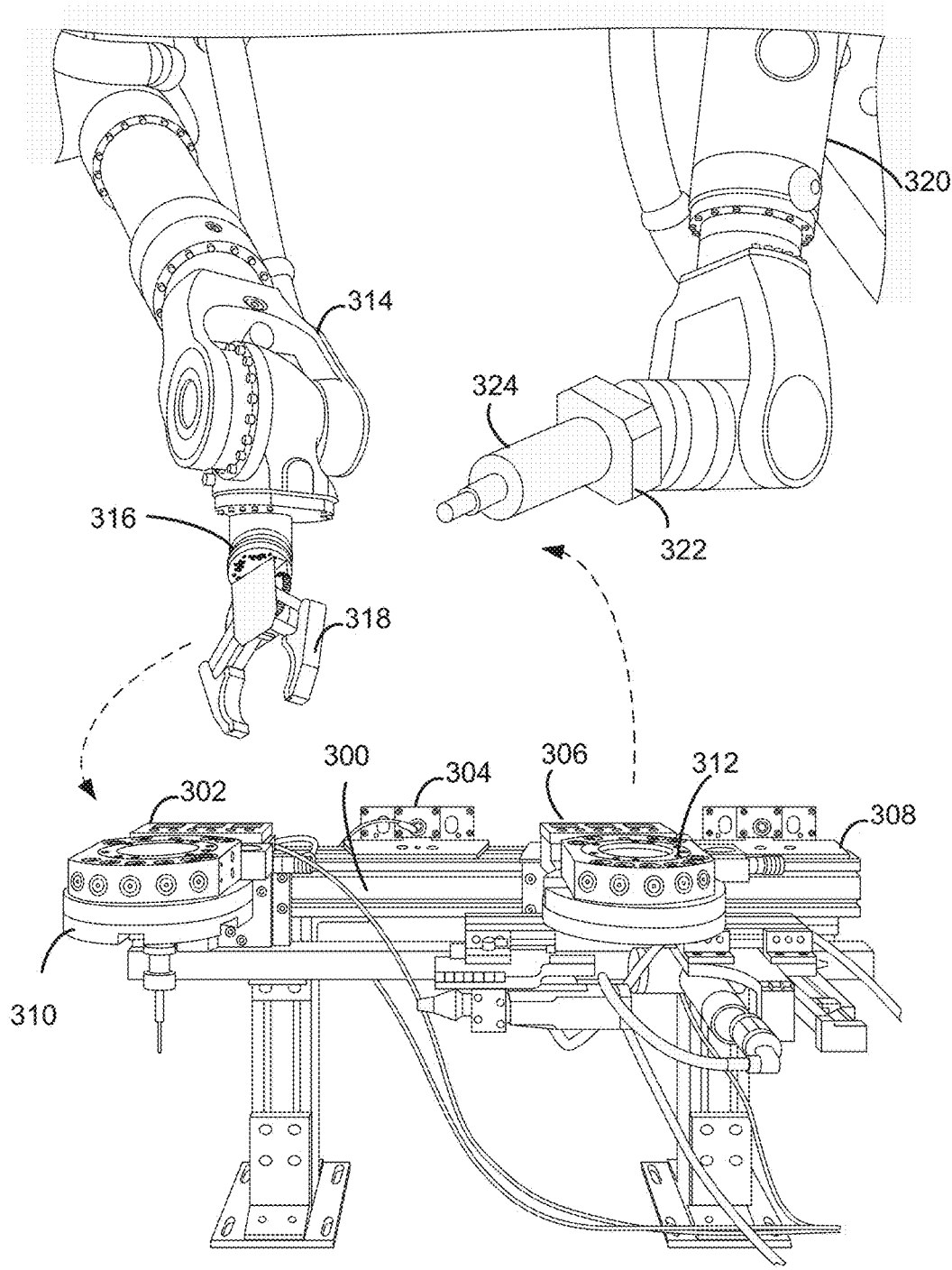
FIG. 3B shows a view of a tool rack and two robots, according to an example embodiment.

FIG. 3B illustrates use of the tool rack to equip robotic devices with tools, according to an example embodiment. In particular, a first robotic device 314 may move its end effector 316 to a position over a slave module 310 that interfaces with a tool rack module 302 of a tool rack. For instance, the robotic device 314 may currently be equipped with gripper 318, and may be controlled to move to the tool rack in order to place gripper 318 in the tool rack and equip a different tool held by tool rack module 302. Additionally, a second robotic device 320 may have positioned its end effector 322 on slave module 312 in order to equip spindle 324, which may have been held by slave module 312. After equipping spindle 324, robotic device 320 may then proceed to move away from the tool rack and complete operations using the spindle 324. The tool rack modules may be positioned on the tool rack so that multiple robotic devices may equip or change tools at the same time. In some examples, additional rack modules 304, 308 may contain additional tools that may be equipped by one or more robotic devices.

In further examples, instructions from a control system, such as master control 10 described with respect to FIG. 1, may be used in order to instruct a robotic device how to equip a tool during runtime (e.g., to determine where a tool is within the tool rack and solve an end effector problem in real time in order to position the end effector over a slave module to enable the robotic device to pick up the tool). In additional examples, a drive system (e.g., a VFD used to supply power drive a spindle) may be mounted at a separate fixed location within a physical workcell in order to supply power on the tool changer system.

IV. Example Graphical Interfaces

Figure 4A:
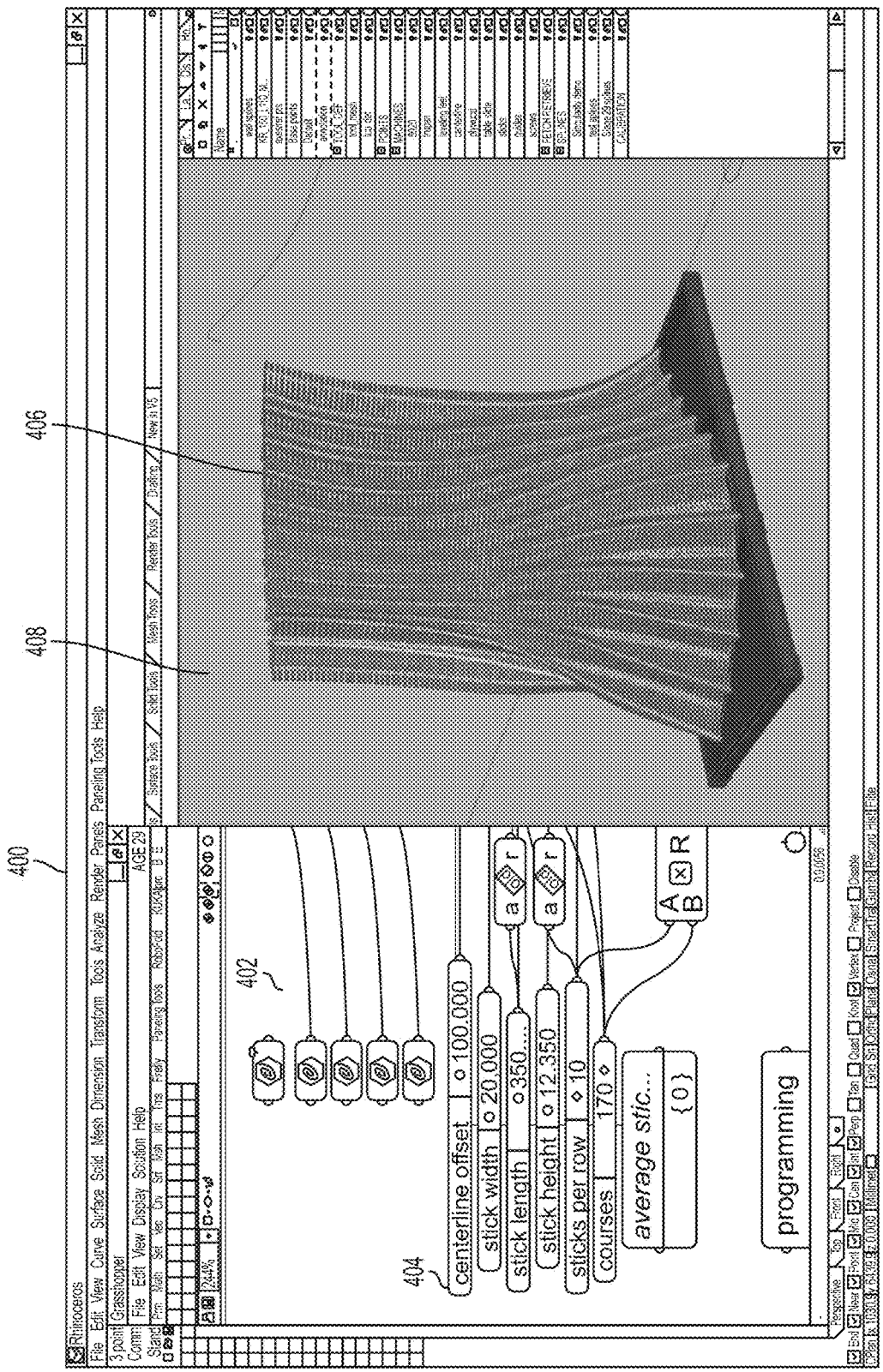
FIG. 4A shows a graphical interface with a 3D model, according to an example embodiment.

FIG. 4A shows a graphical interface containing a 3D model, according to an example embodiment. As shown, a graphical interface 400 may contain an input window 402 which may allow a user o enter parameters relating to an output product 406, such as a wall built using individual sticks. The input window 402 may allow the user to enter parameters 404 that may relate to aspects of the output product, including dimensions, density, curvature properties, other geometric properties, materials to be used, and/or other numeric inputs. The inputs may be used to derive a parametric solution for an output product 406. Additionally, the inputs may be used to generate a sketch of the output product 406 within a display window 408 of the graphical interface 400.

Figure 4B:
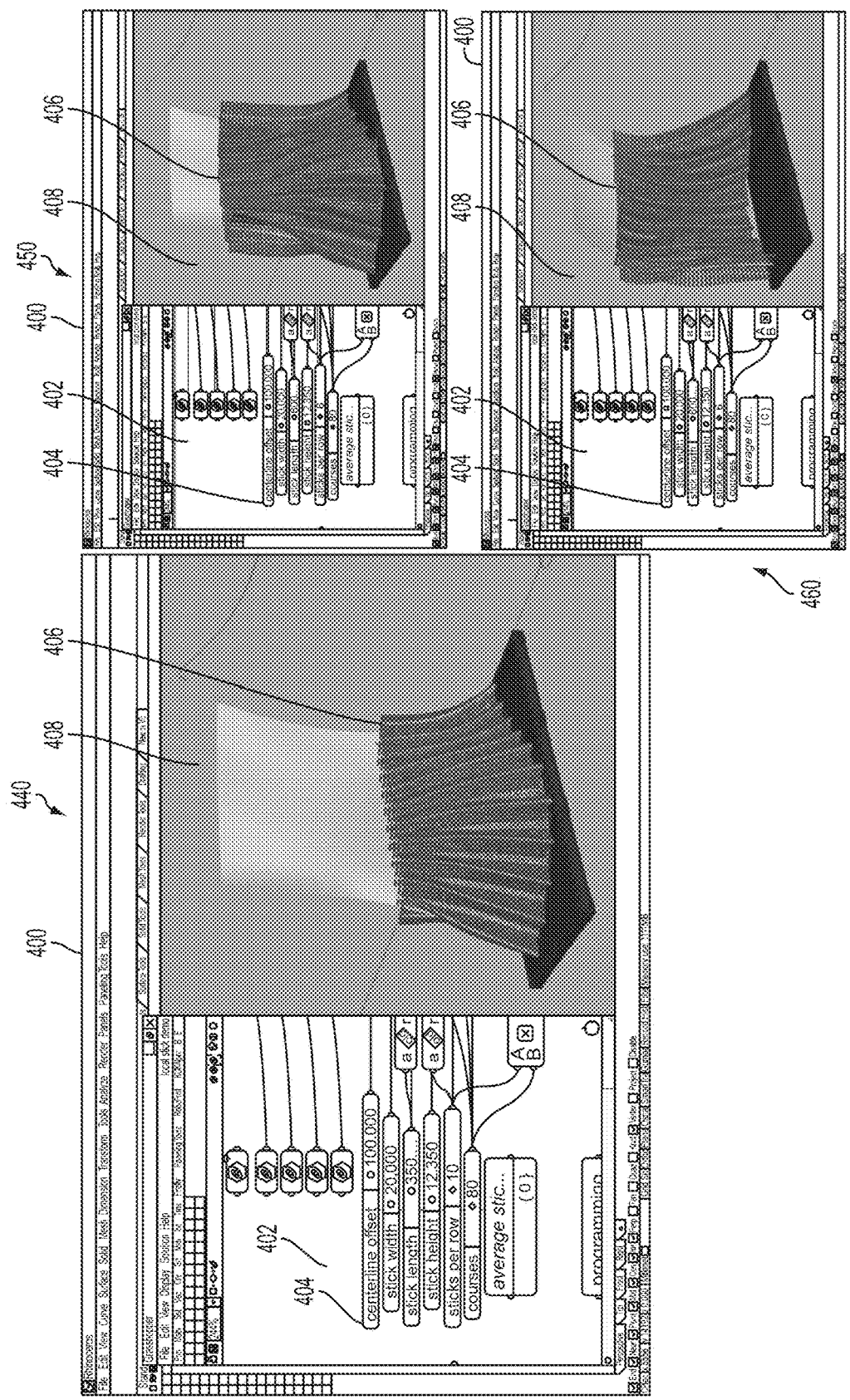
FIG. 4B shows additional graphical interfaces with 3D models, according to an example embodiment.

FIG. 4B shows three different output products based on different user input parameters, according to an example embodiment. A first view of the graphical interface 440 may contain an input window 402 and a display window 408, The input window 402 may allow a user to enter parameters 404 relating to a desired output product, including product dimensions, density, curve offsets, amount or type of curvatures, and/or other geometric or numerical inputs. Based on the input parameters 404, a geometric representation of the output product 406 may be displayed within the display window 408. In some examples, a user may modify individual parameters 404 in order to change aspects of the output product 406.

For instance, a second view of the graphical interface 450 shows a different output product 406 within the display window 408 based on different input parameters 404 within the input window 402. In this example, dimensions of the output product 406 and/or materials used to produce the output product 406 may be modified to produce an output product 406 with a greater height as shown in the second view 450. Further, a third view 460 shows another different output product 406 within the display window 408 based on different input parameters 404 within the input window 402. For example, parameters relating to the curvature of the output product may be modified by a user in order to produce another different output product 406 as shown in the third view 460.

Figure 5:
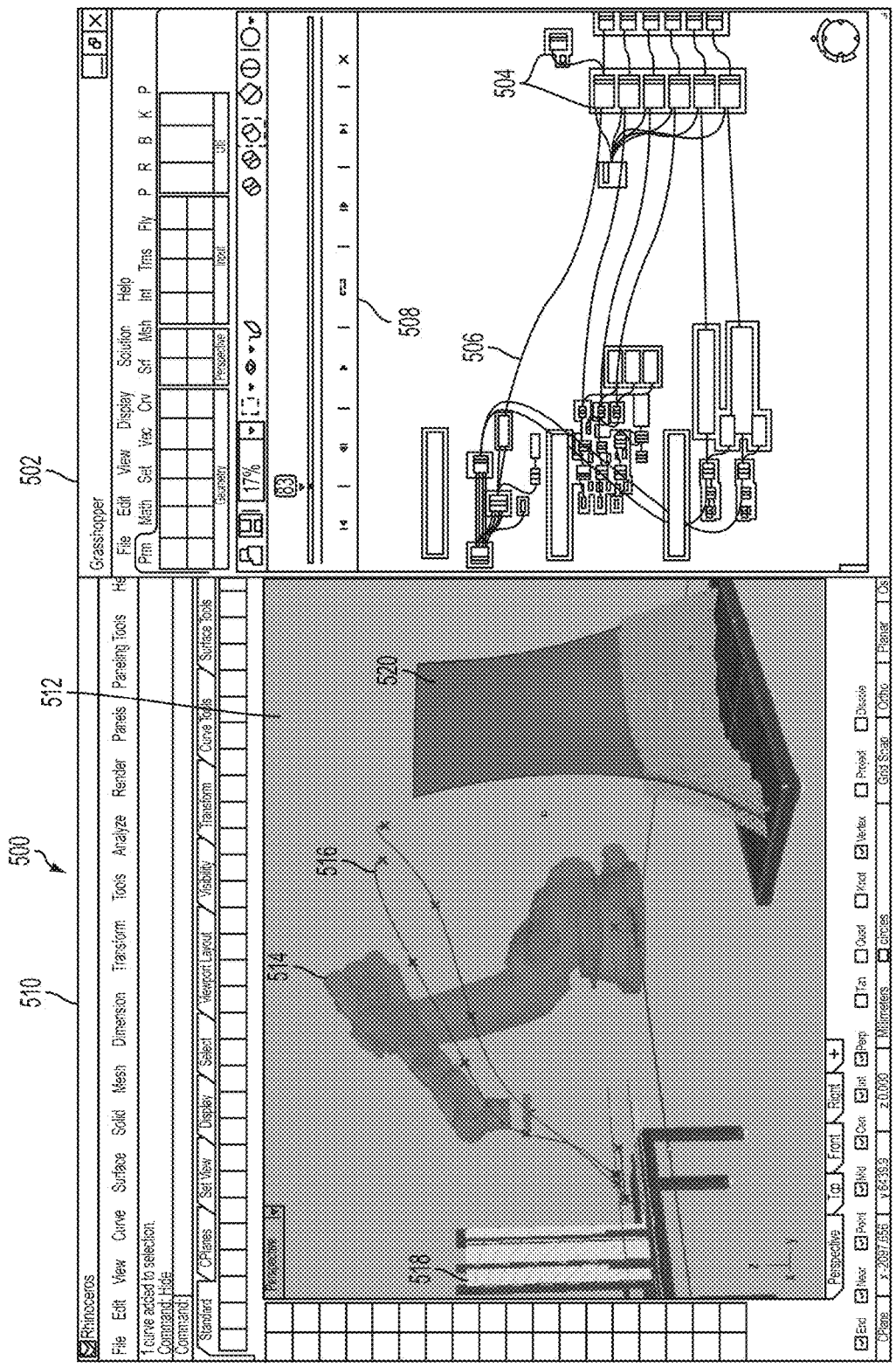
FIG. 5 illustrates a node-based graphical interface and a visualization of a building process, according to an example embodiment.

FIG. 5 shows a graphical interface for architecting a robotic building process, according to an example embodiment. For example, the graphical interface may be part of software control 26 as described above with respect to FIG. 1. As shown, a graphical interface 500 may contain an input window 502 which allows a user to control aspects of the building process, including nodes related to robot actors, tools, motion paths, and tool operations for use during construction. The graphical interface 500 may additionally contain a display window 510 which contains a 3D geometric view of the physical workcell, including components such as robot actors, tools, materials, and/or constructed output products. In example embodiments, the input window 502 may provide a visual programming interface or different type of interface that may allow a user to enter parameters describing a desired output product and/or information about the actors and tools to be used in the building process. Input data collected using the input window 502 may be used to control geometry and/or other aspects of the physical workcell displayed within the display window 510.

In one example, a user may input parameters to control a building process using an input window 502 containing a visual programming interface, such as an interface built using a visual programming language, such as a commercial software program known as Grasshopper. The interface may allow a user to include one or more nodes 504 which may represent components of the building process, such as robot nodes representing different types and/or configurations of robots, tool nodes representing different types and/or configurations of tools, IO nodes representing types of available IO, track nodes representing possible tracks of motion of robot actors, and command nodes for determining motion commands and other types of commands for robot actors.

As shown within window 502 of FIG. 5, individual nodes 504 may be connected together using connectors 506. A connector 506 between two nodes may indicate that the output of a first node is to be used as an input to a second node. For instance, a single robot node may receive as inputs information from several different component nodes, such as nodes representing the type of robot, the type of tool used by the robot, a track the robot can travel along, and so on.

In further examples, the window 502 of FIG. 5 may contain a timeline 508. The timeline 508 may have a cursor representing a current timestamp (e.g., 83 as shown in the figure) which may represent a particular point in time of the manufacturing process. In addition, the timeline 508 may contain buttons to play through the building process at a particular speed, or fast-forward or rewind through the building process. The timeline 508 may be used to control the point in time at which the geometry and/or other aspects of the physical workcell are displayed within the display window 510. Further, the timeline 508 may be used to indicate a particular point in time either for purposes of simulating the building process or for visualizing within software an actual physical building process taking place within the physical world.

As shown in FIG. 5, the user interface may additionally contain a display window 510 which may display geometry and/or other aspects of the physical workcell based on inputs from the input window 502. For example, the display window 510 may include geometry relating to robot actors, tools, building materials, robotic motion paths, and output products, among other things. In one example, the display window 510 may be designed using a commercial 3D modeling software, such as Rhinoceros, as shown within FIG. 5. The display window 510 may display geometry within a particular physical workcell 512. The display window 510 may include options to change the perspective of the physical workcell 512 and/or to zoom in or zoom out a view of the physical workcell 512.

The physical workcell 512 may include one or more robot actors 514. The robot actors 514 may be device actors 42 and/or 44 as described above with respect to FIG. 1 and/or robotic device 200 as described with respect to FIGS. 2A-2C. Support may be provided for numerous different types of multi-axis robotic systems of different types and/or from different manufacturers. In some examples, one or more of the robot actors 514 may be traditional six-axis robots. In additional examples, other types of robots that may be configured to operate along fewer or more axes may be included for use within the physical workcell 512 in addition or instead.

In further examples, robot actors may be represented within a software interface as robot nodes, which may be put together from a number of interchangeable component nodes, including robot nodes representing different makes and models of commercial robots, tool nodes representing different types of physical tools that may be used for construction such as grippers or spindles, IO nodes representing different types IO available to communicate with a robot actor and track nodes representing different types of axes that a robot can move along. In some examples, individual tools and/or tooling parameters (such as wrist mount offsets or tool center points) can be abstracted into components that can be assembled by a user into compound tools as well, The display window 510 may additionally contain one or more motion paths 516 representing paths of motion of individual robot actors 514. The motion paths 516 may indicate paths to be taken by the robot actors 514 during the building process, such as to pick up materials and attach them to an object under construction. In some examples, the motion paths 516 may further indicate points at which particular input or output actions will occur. For instance, an "x" on a motion path 516 may indicate a point at which a robot actor 514 uses a tool such as a gripper to pick up a particular type of material, In further examples, the motion paths 516 may be synchronized with the timeline 508 from the input window 502. Accordingly, in some examples, the robot actors 514 may be made to move along the motion paths 516 to positions at particular points in time based on the timestamp indicated by the timeline 508.

The physical workcell 512 may additionally contain one or more materials 518 to be used during the building process. In this simplified example, the materials 518 consist of sticks used to construct a wall 520. Motion paths 516 may be determined for the robot actor 514 to take in order to move the individual sticks 518 onto the wall 520. In other examples, a variety of different types of materials, including connective materials such as glue, may be used simultaneously by the robot actors to construct more complex output products.

In further examples, the physical workcell 512 may also contain other components not shown in FIG. 5 that may be used in the building process. For instance, one or more sensors may be included to sense information about the robot actors and/or materials in the physical workcell in order to influence motion paths taken by the robot actors.

For example, a torque sensor may be used to determine if a particular piece of material is likely to break under stress. A control system, such as master control 10 described above with respect to FIG. 1, may be used to interface with the robot actors and/or sensors within the physical workcell.

In some examples, the display window 510 may provide users with multiple 3D views of the physical workcell, and may allow a user to change the orientation and/or zoom of a particular view. In other examples, the display window 510 may present other types of representations of the physical workcell, such as numerical representations, as well or instead.

V. Example System Workflow

Figure 6A:
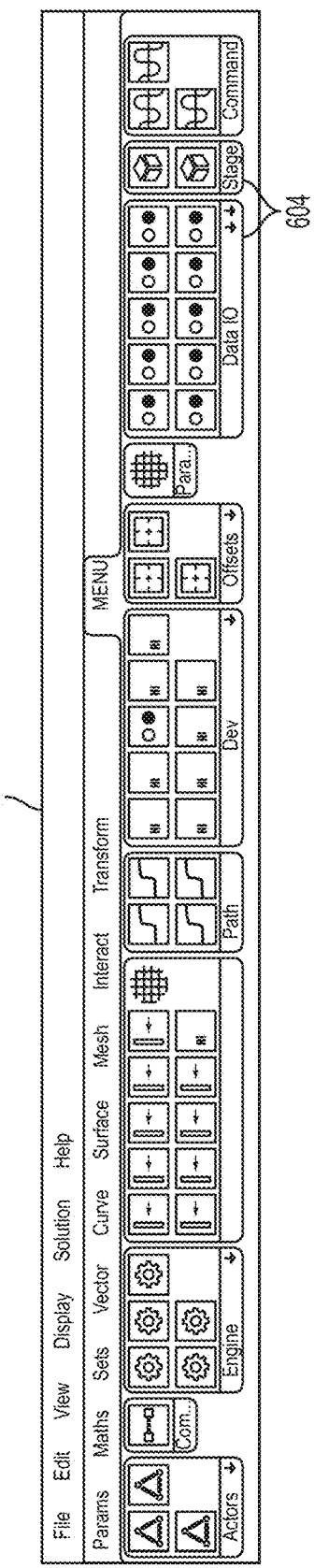
FIG. 6A illustrates a toolbar for a graphical interface, according to an example embodiment.

In some examples, an input window may additionally contain a toolbar containing digital tools to control aspects of the building process. FIG. 6A shows a toolbar for a graphical interface, according to an example embodiment. The toolbar 602 may be equipped with a variety of different toolsets 604 that may be used to design or control a building process within an input window of a graphical interface. Toolsets 604 may be provided with digital tools relating to generating robot motion paths, transforming between different planes or axes, describing robot actors, describing physical building tools, sequencing individual robot motions, communicating data input and/or output to and/or from robot actors, mapping between a virtual software environment and a physical workcell, and/or enabling visualization of a building process, for example.

Figure 6B:
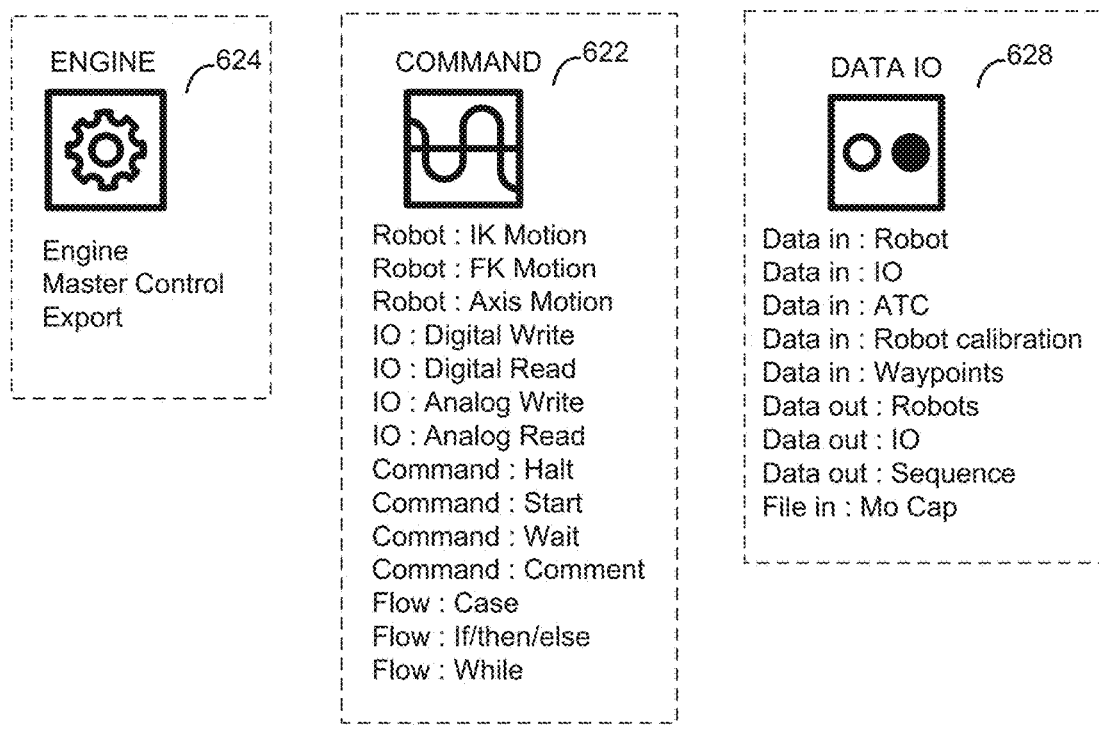
FIG. 6B illustrates an organization of digital tools, according to an example embodiment.
Figure 6C:
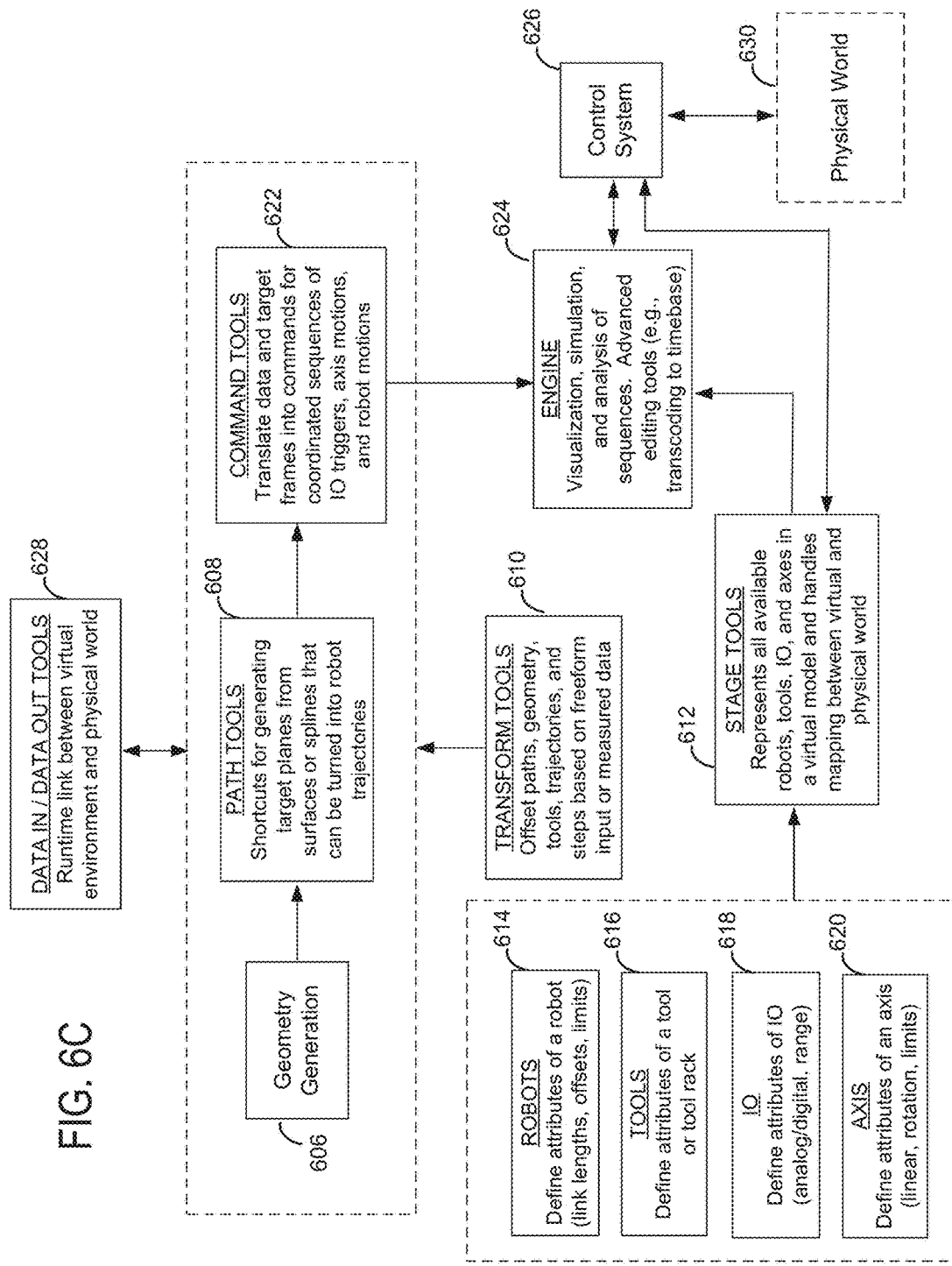
FIG. 6C is a block diagram of an example workflow, according to an example embodiment.

FIG. 6B shows an organization of digital took within a toolbar, according to an example embodiment. As shown, the digital tools ay be divided into a number of different categories. The digital tools may then be used in combination to design a building process, as shown by FIG. 6C. FIG. 6C is a block diagram of an example workflow, according to an example embodiment. In particular, FIG. 6C shows a workflow involving a number of digital tools, which may be accessible within a toolbar as depicted in FIG. 6A and FIG. 6B or by another means within a graphical interface. As shown, the digital tools may be divided into a number of different categories. One or more digital tools from a number of different categories may be selected by a user to affect particular aspects of the building process, including the robot actors and other components within a physical workcell that may be used in the process.

In one example, a toolbar may include path tools 608 relating to generating target planes that may be used to determine motion paths of robot actors. In some examples, the path tools 608 may take as input geometry 606 describing a desired output product, such as geometry generated by parametric modeling software, Grasshopper. For instance, the output product geometry 606 may be generated based on user input within an input window specifying aspects of the output geometry, including dimensions, density, curvature, materials, and so on. The path tools 608 may then determine target planes for robot motion paths based on the output product geometry 606.

In some examples, the output product geometry 606 may include particular splines, surfaces, and/or other geometrical constructions to be included within an output product. The path tools 608 may then provide shortcuts for generating target planes relating to aspects of the output product in a format that can be turned into particular robot trajectories that may be used to construct an output product containing the target planes. Motion paths for individual robot actors may then be derived as a function of the target planes in addition to tool definitions and material properties, for example.

In further examples, a toolbar may include transform tools 610 relating to transformations between different axis frames or offsets, as shown by FIG. 6B and FIG. 6C. For instance, the transform tools 610 may provide transformations between coordinate frames at the base or joints of a particular robot and a stage containing the output product. In other examples, the transform tools 610 may additionally allow for transformations between multiple robots operating within different frames of reference as well. As shown in FIG. 6C, transformations may be applied before and/or after determining sequences of motion for individual robot actors.

In further examples, a toolbar may include stage tools 612 that represent aspects of a physical workcell, such as robot actors, tools, IO, and/or axes. In some examples, stage tools 612 may also provide a mapping between virtual robots in software and physical robot actors within the physical workcell, as shown by FIG. 6B and FIG. 6C. The stage tools 612 may be used by engine node 624 to send trajectories for robot actors to take based on output from command tools 622 to a control system 628. In some examples, stage node 612 may be configured in order to specify the currently available robotic devices and/or tools within a particular physical workcell. The control system 626 may then command robot actors and/or other components within the physical world 630 based on information from stage tools 612.

In some examples, stage tools 612 may take input from one or more robot nodes 614 representing attributes of individual robot actors within a physical workcell, as shown by. FIG. 6B and FIG. 6C. A robot node 614 may be used to define attributes of a robot actor, such as traditional six-axis robots or other types of robots. The robot attributes may include link lengths of the robot and/or arm lengths of the robot, offsets of the robot and/or joints of the robot, and/or limits on robot joint movement or maximum torque that a robot joint can handle, for example.

In additional examples, stage tools 612 may also take input from one or more tool nodes 616 for defining the attributes of physical building tools and/or a tool rack for holding the tools, as shown by FIG. 6B and FIG. 6C. For example, attributes of building tools such as grippers or spindles may be specified by tool nodes, which may be used to configure an automatic tool changer so that robot actors can easily switch between tools. In some examples, robot actors may switch between tools using a tool rack which stores the tools and facilitates a tool changing process, as described above with respect to FIGS. 3A and 3B.

In further examples, the tool nodes 616 may include support for compound tooling that may allow component tools to be assembled into compound tools. In particular, individual tooling parameters (e.g., wrist mount offsets or tool center points) may be abstracted into components that may be assembled into compound tools. For instance, multiple tools may be aggregated into one compound tool that has multiple tool orientations and/or center points that may be used depending on which component of the tool may be required at a particular time. For example, a compound tool with an automatic tool changer may be represented by a master interface plus a number of different attachments, such as a spindle, a vacuum array, or a gripper. In another example, a compound tool may include a series of different tools, such as a gripper plus a tensioner plus a roller. Other examples of combining multiple tools and/or combining tools by abstracting tooling into parameters that define tool orientation and/or center points are also possible.

In further examples, stage tools 612 may also take input from one or more IO nodes 618. The IO nodes 618 may describe information relating to digital and/or analog input and/or output actions that may be taken by a robot actor, such as the type of action (e.g., gripping a material) and attributes associated with the action (e.g., width of material that can be gripped). In additional examples, the robot attributes may include one or more axis nodes 620. The axis nodes 620 may describe one or more linear and/or rotational axes along which a robot can travel, including limitations on the robot's movements along the axes.

In additional examples, a toolbar may include command tools 622, as shown by FIG. 6B and 6C. The command tools 622 may be used to determine robot commands to cause one or more of the robot actors to execute particular operations, which may include point-to-point motions, motions along external axes, and/or input or output events. For example, one of command tools 622 may be used to direct a particular robot motion along one of six degrees of freedom, a particular robot motion along an external axis, or a particular input or output event, such as applying glue to a material in a particular manner. Additionally, command tools 622 may be included for creating step nodes that instruct robot actors to take a particular sequence motion steps and carry out one or more tool actions. In further examples, coordinated sequences of motions may be generated for multiple robot actors working together within a single timeframe.

In some examples, step nodes, or sequences of motions and actions, can be abstracted into reusable subroutines. For instance, a subroutine can be defined by connecting visual building blocks, which may represent particular motion commands or motion parameters. The subroutine could then be used to make one or more robots carry out the same action sequence multiple times within a single building process. In some examples, steps can be synchronized across multiple robots so that multiple robots can work in a shared environment simultaneously. Example systems may also include an engine node 624, which may assign each of the steps to particular robotic devices within a stage.

In further examples, users may be provided with functionality to switch between steps within the graphical interface. For instance, timeline 508 as illustrated and described with respect to FIG. 5 may also includes buttons to skip between steps on the timeline. In some examples, digital bookmarks may be inserted by a user for particular steps. For instance, through the graphical interface, it may be possible to jump from the beginning of a "fetch stick" step to the beginning of a "nail stick" step. These bookmarks steps within the timeline may match the steps authored by the user by inputting motion commands, IO commands, and/or other commands in a step node.

Additionally, the engine node 624 may communicate with control system 626. The control system 626 may be a computing device capable of communicating wirelessly with robot actors and/or other components such as sensors within the physical workcell in the physical world 630. In particular, the control system 626 may provide access to real time data streams from all robot actors and devices, which may allow for precise control over the physical workcell at particular points in time. The control system could communicate with some or all of the actors or devices through wired connections or other types of communication channels as well or instead, including previously described network protocols.

In some examples, the control system may additionally contain a physical control interface such as a touchscreen interface that may allow a user to interact with the control system to view live data or modify robot actions in real time. For instance, a stage file containing information about the physical workcell including actors, tools, materials, and environmental setup on the control system 626 may be accessible via a programming interface. A user who is watching a building process within the physical world 630 may then make modifications to the process before it is completed.

In additional examples, a toolbar may include data input/ output tools 628 that may allow the control system 626 to send and/or receive data to and/or from the virtual software environment that determines robot motion paths, as shown by FIG. 6B and FIG. 6C. Accordingly, telemetry from the control system 626 may be used to create a live link between the virtual world in software and the physical world 630. For instance, the data input/output tools 628 may be used to process information from the control system 626 relating to the robot actors within the physical workcell and/or other components in the workcell such as sensors. Based on this information about the physical world 630, the virtual robots within software may be updated with real-time feedback from the physical world 630 (e.g., motion paths for robot actors may be determined or modified based on real-time sensor data).

Additionally, the data input/output tools 628 may be used to send data back to the control system 626 so that the control system 626 can effectuate particular input or output actions within the physical world 630, for example. For instance, the control system 626 may instruct a robot actor how use a tool in the physical world 630 (e.g., how to control a spindle) based on information from one or more digital tools within the software interface.

In further examples, engine node 624 include visualizer or simulation tools that may allow a user to simulate a building process through a user interface in software, as shown by FIG. 613 and FIG. 6C. In some examples, the visualizer tools may display the building process as geometry drawn on a screen that shows the physical workcell. In other examples, the visualizer tools may display the building process as curves representing particular data values as well or instead. Additionally, in further examples, the visualizer tools may also be used to visualize a building process in software as it is actually occurring within the physical world 630. In some examples, the visualizer tools may additionally provide a graphical representation of potential conflicts within a particular building process, such as when a robot's motion path extends outside its possible range of motion or when two robot actors may be going to collide based on the currently defined trajectories and/or step sequences.

In further examples, the visualizer component may allow a user to see simulations of the building process in advance and/or as the building takes place. In some examples, the user may use the visualizer component offline to see robotic motion paths as well as input/output events over a series of sequential steps as geometry drawn within a viewing window. In other examples, the user may be able to visualize a simulated playback as numerical data streams relating to the robot actors, materials, and/or other aspects of the physical workcell represented through curves in addition to or instead of visual geometry. In further examples, the user may also be able to see particular data points at individual timesteps, such as robotic joint values, axis values, or input/output values.

In some example systems, a user may also be able to use the visualizer component to visualize a building process that is occurring in the physical world in real time. The system may interface with a control system that receives real-time data streams from sensors that may be used to scan the physical workcell, individual robot actors, and/or parts used in construction as an output product is being built. Accordingly, the visualizer's user interfaces may be updated in real time to reflect real world dimensions, properties, and/or positions of objects and actors within the environment.

VI. Example Methods

A method 700 is provided for causing one or more robot actors to construct an output product, according to an example embodiment. In some examples, method 700 may be carried out by a control system, such as manufacture control system 100, master control 10, and/or software control 26 as described in reference to FIG. 1. The control system may communicate with the robot actors using any of the network protocols or communication methods previously described. In additional examples, part or all of method 700 may be executed by any of the graphical interfaces or systems described and illustrated with respect to FIGS. 4A-4B, 5, and 6A-6C. In further examples, part or all of method 700 may be carried out by one or more robotic devices, such as device actors 42, 44 within system devices 40 as described in reference to FIG. 1, or device actor 200 as illustrated and described in reference to FIGS. 2A-2C. Additionally, while examples with certain numbers and types of system devices may be described, various alternative embodiments may include any number and type of robotic devices as well.

Furthermore, it is noted that the functionality described in connection with the flowcharts described herein can be implemented as special-function and/or configured general-function hardware modules, portions of program code executed by a processor for achieving specific logical functions, determinations, and/or steps described in connection with the flowchart shown in FIG. 7. Where used, program code can be stored on any type of computer-readable medium, for example, such as a storage device including a disk or hard drive.

Figure 7:
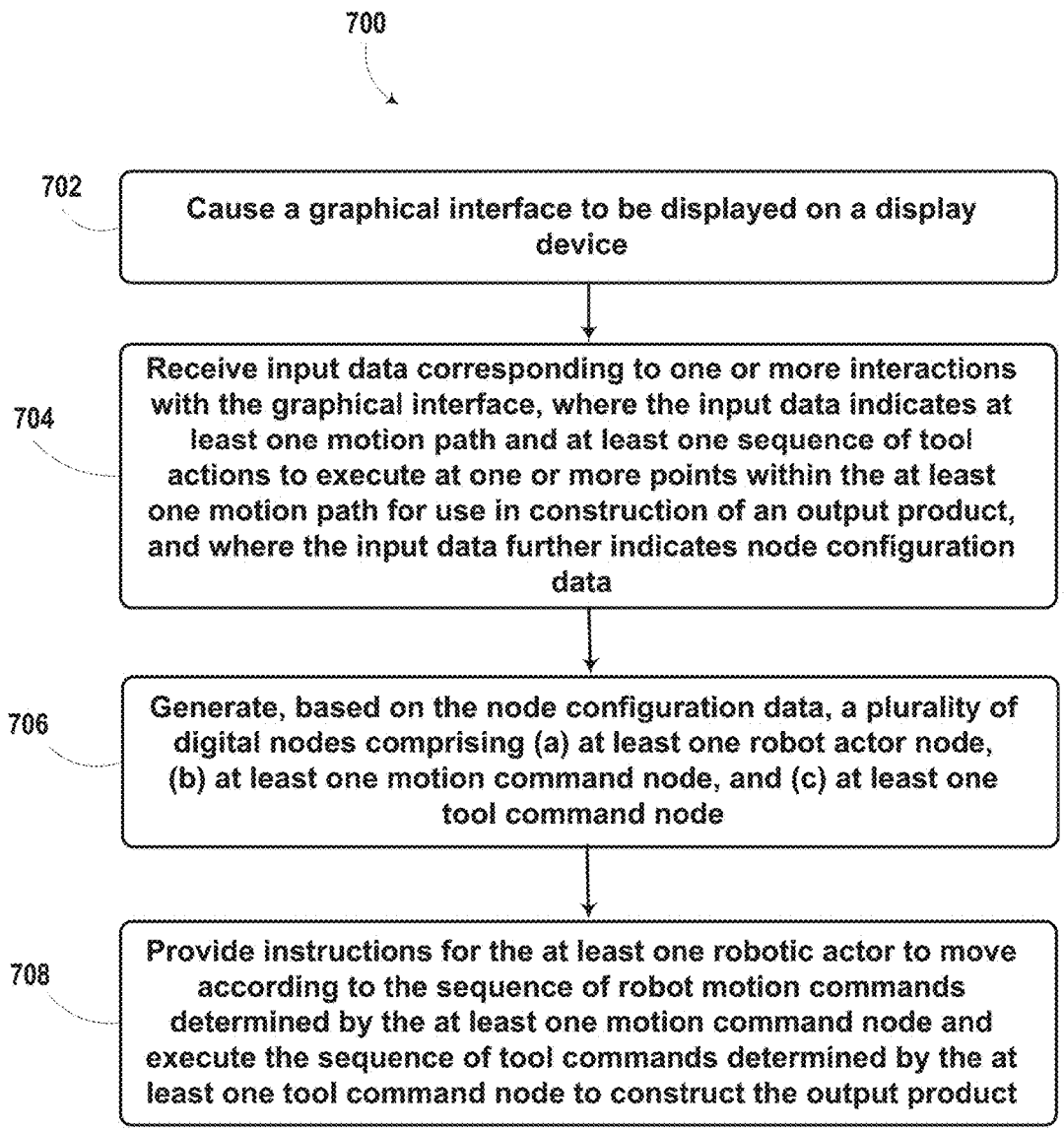
FIG. 7 is a block diagram of an example method, according to an example embodiment.

In addition, each block of the flowchart shown in FIG. 7 may represent circuitry that is wired to perform the specific logical functions in the process. Unless specifically indicated, functions in the flowchart shown in FIG. 7 may be executed out of order from that shown or discussed, including substantially concurrent execution of separately described functions, or even in reverse order in some examples, depending on the functionality involved, so long as the overall functionality of the described method is maintained.

As shown by block 702 of FIG. 7, method 700 may initially involve causing a graphical interface to be displayed on a display device. In particular, a graphical interface may be provided that allows for configuration of one or more robot actors for use during a building process. In some examples, the graphical interface may include a display window containing a 3D model of a physical workcell, as described and illustrated with respect to FIG. 4A-4B. In further examples, the graphical interface may additionally include an input window containing a configurable node-based interface as described with respect to FIG. 5. Other types or variations of graphical interfaces could be used as well. For instance, in some examples, the display window and the input window could be combined into a single graphical interface and/or divided into multiple additional sub-windows. In further examples, the graphical interface could be displayed on a PC workstation, a touch-surface device, or on a number of other different types of computing devices.

As shown by block 704 of FIG. 7, method 700 may additionally involve receiving input data corresponding to one or more interactions with the graphical interface. Users may interact with the graphical interface in a number of different ways. In particular, a user may be provided with one or more menus or toolbars that allow for configuration of aspects of a physical workcell and/or automated building process. In some examples, users may be able to select and position digital nodes, which may be represented as shapes, icons, text, modules, or as other graphical representations on a display. In further examples, the user may additionally be able to connect two or more nodes together (e.g., by using a pointing device or touch-surface interface) in order to indicate a logical relationship between the nodes (e.g., the output of one node may act as input for a second node). In other examples, data may be received through the graphical interface in other ways. For instance, a user may be able to type or otherwise enter numerical input or other types of input relating to certain aspects of a building process as well. In additional examples, user may be able to interact with geometry in a 3D modeling display (e.g., by drawing a line between two positions in a modeling environment).

In further examples, the received input data may indicate at least one motion path and at least one sequence of tool actions to execute at one or more points within the at least one motion path. In particular, a motion path may indicate a path of motion for an end effector of a robot actor to follow within the physical workcell. At one or more points of the motion path, particular tool operations may be specified, such as to pick up an object, place an object, use a drill, or apply glue to a surface. An example motion path and sequence of tool actions is illustrated and described above with respect to FIG. 5.

In some examples, a motion path may be defined by a sequence of frames, or planes with six degrees of freedom in Cartesian space. For instance, the sequence of frames may indicate a path for an end effector of a robot actor to follow in order to get from one point within the physical workcell to another point (e.g., to pick up a stick and then move to place the stick on a wall). In some examples, a user may enter a motion path through the graphical interface by drawing a line from one point in a 3D display window to a second point, representing two points within the physical workcell. Motion paths may also be entered in other ways in some examples as well, such as by entering numerical data representing particular Cartesian coordinates within the physical workcell.

In further examples, a user may be provided with path tools, as described with respect to FIGS. 6A-6C, in order to assist the user in inputting motion paths through the graphical interface. In particular, a user may first determine a model of a desired output product, as described with respect to FIGS. 4A-4B. Based on parameters entered to describe the output product, mathematical models may be generated in order to represent the geometry of the output product as splines or surfaces. Path tools may be provided that determine target frames on the output product based on the mathematical models. In some examples, the target frames may then be used in order to assist the user in determining motion paths for robot actors to follow. For instance, a target frame may indicate a particular frame (e.g., position and orientation) in which a robot's end effector can be positioned in order to place a stick at a particular point on a stick wall. In some examples, the user may be able to manipulate the motion path in between particular target frames.

In additional examples, the received input data may further indicate node configuration data. As previously described, a user may be able to select and configure a variety of digital nodes in order to configure a manufacturing process. Node configuration data may indicate how to represent particular nodes within a display window. In further examples, node configuration data may be received based on menu selections, commands from a pointing device (e.g., nodes may be drag and dropped), and/or through other means of user interaction.

Figure 8A:
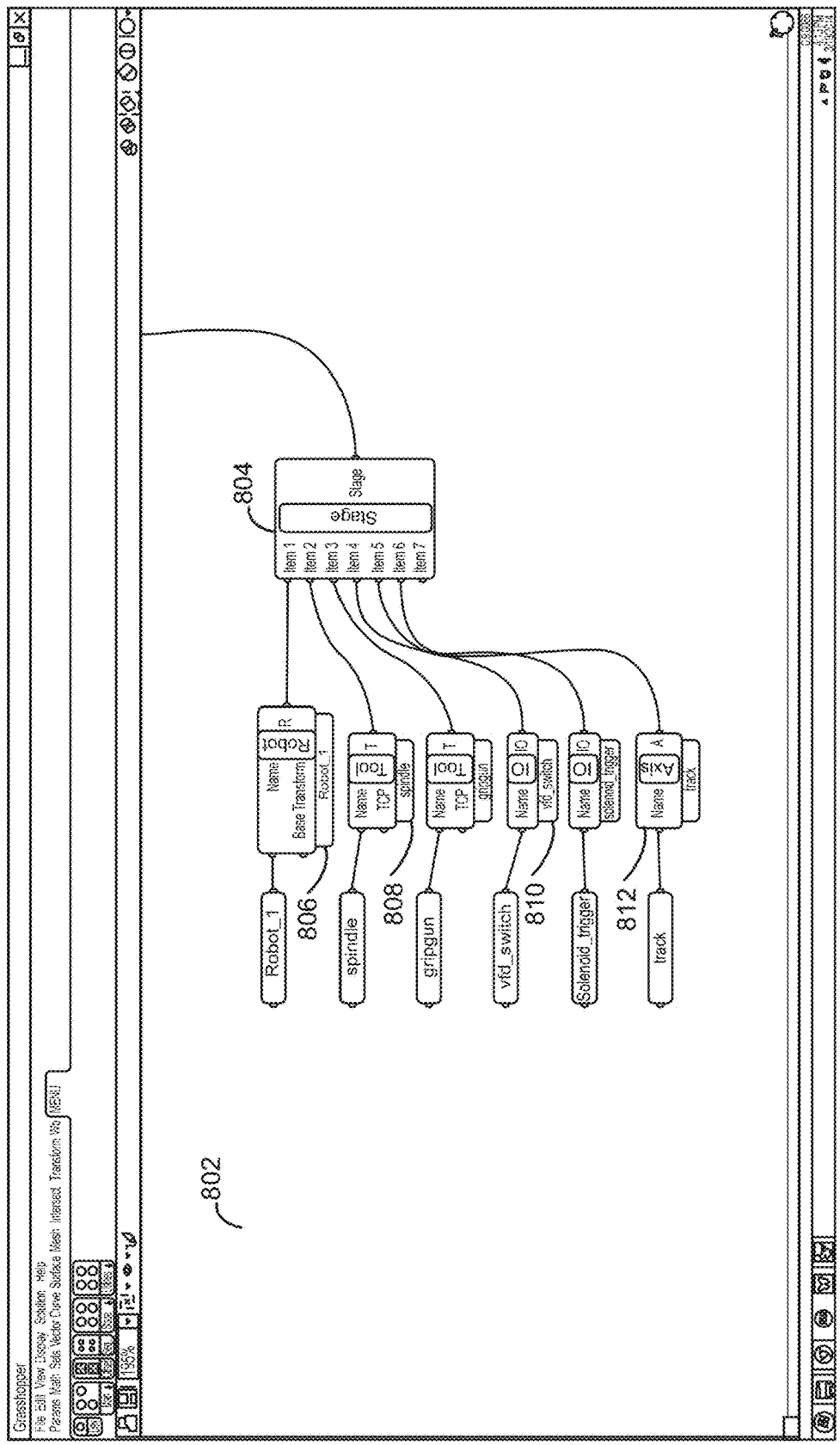
FIG. 8A illustrates a graphical interface with a digital robot actor, according to an example embodiment.
Figure 8B:
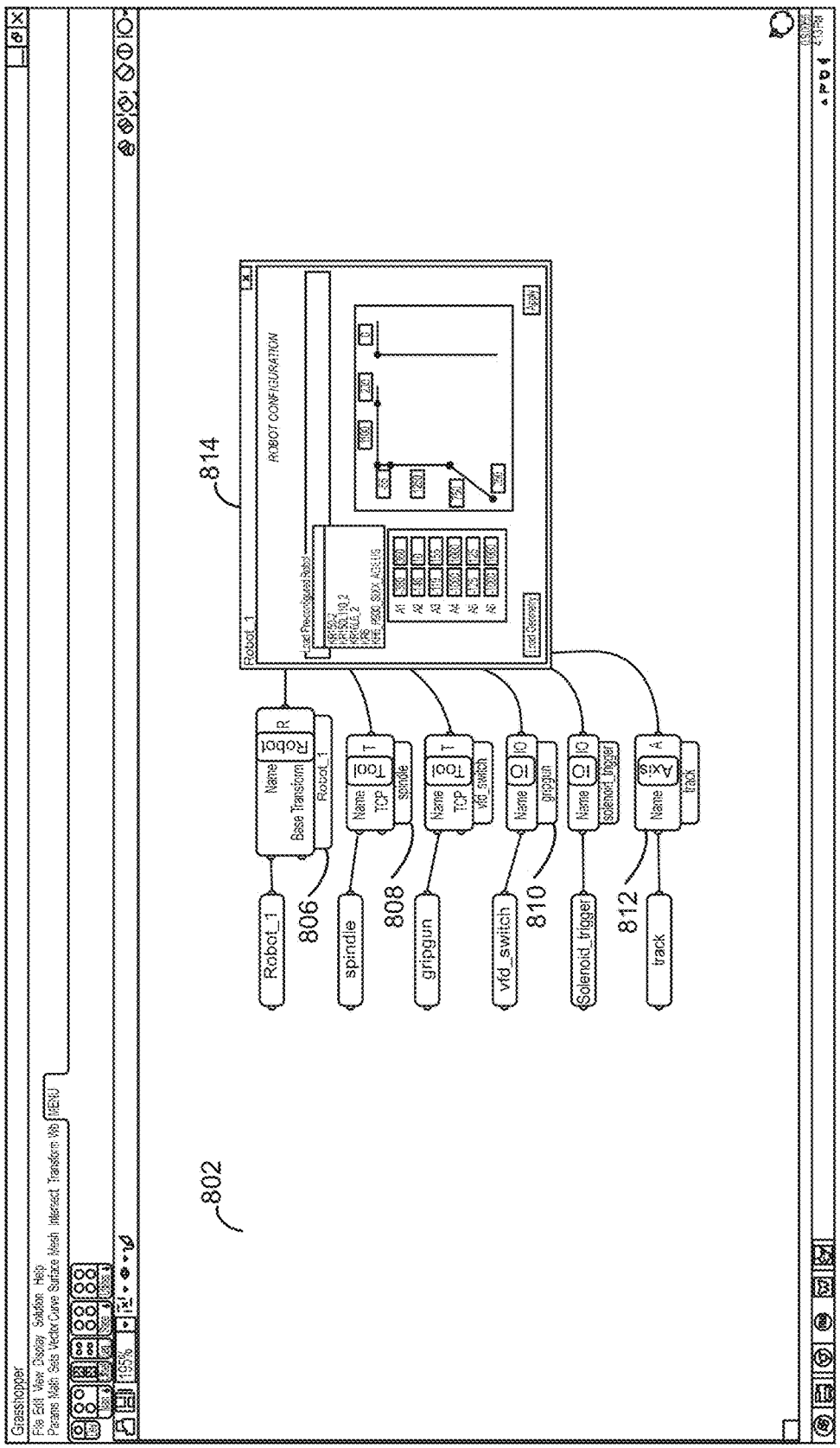
FIG. 8B illustrates a graphical interface with a digital robot actor and a dropdown menu, according to an example embodiment.
Figure 8C:
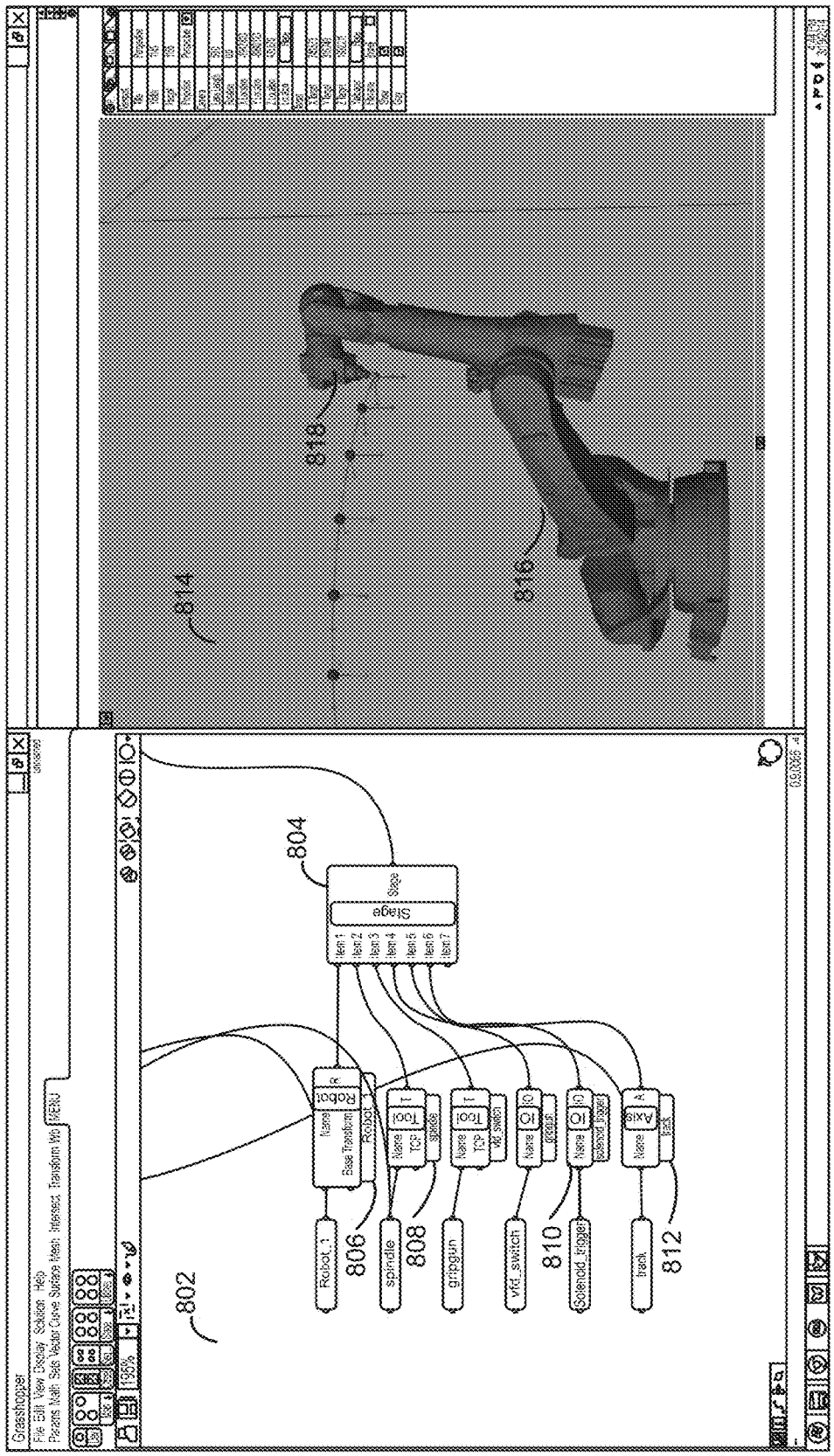
FIG. 8C illustrates a graphical interface with a digital robot actor and a visualization of the digital robot actor, according to an example embodiment.

As shown by block 706 of FIG. 7, method 700 may further involve generating, based on the node configuration data, a plurality of digital nodes. In particular, based on input received through the graphical interface, a configuration of digital nodes may be determined and displayed within a display window. FIGS. 8A-8C collectively show an example configuration of digital nodes, according to an example embodiment. The simplified examples shown in FIGS. 8A-8C and elsewhere are meant for demonstration purposes and should not be viewed as limiting. In particular, other types and configurations of nodes besides those specifically illustrated here may be used as well or instead in some examples.

Based on the node configuration data, at least one robot node may be generated. A robot node may include any of the attributes previously described with respect to FIG. 6A-6C. An example robot node is shown in FIG. 8A. In particular, a robot node 806 may be generated and displayed within an input window 802. The robot node 806 may be used to define attributes of a robot actor, such as traditional six-axis robots or other types of robots. For instance, robot node 806 may describe kinematic system characteristics of a particular make and model of robot, including robot attributes such as link lengths of the robot and/or arm lengths of the robot, offsets of the robot and/or joints of the robot, and/or limits on robot joint movement or maximum torque that a robot joint can handle, for example. In further examples, robot node 806 may also include information relating to tool actions or other types of actions that may be taken by a robot actor, such as the type of action (e.g., gripping a material) and attributes associated with the action (e.g., width of material that can be gripped).

In some examples, one or more robot nodes may connected to a stage node 804, which may describe available robot actors as well as other aspects of a physical workcell, including tools, IO, and/or axes. Using a stage node 804, tools may be shared between robot actors and/or swapped on a particular robot actor at different points of a sequence of robot operations. In some examples, a digital robot actor may further include input from one or more component nodes via stage node 804. In one example, a component node may be a tool node 808, which may indicate one or more tools (e.g., a spindle or grip gun) which may be operable by the robotic device represented by robot node 806. In further examples, a component node may be an IO node 810, which may indicate one or more types of IO (e.g., a VFD switch or solanoid trigger) which may be operable by the robotic device represented by robot node 806. In yet further examples, another component node may be an axis node 812 that may include one or more linear and/or rotational axes along which the robot can travel, including limitations on the robot's movements along the axes. Other configurations of a robot node and other digital component nodes are also possible.

In some examples, a robot node and/or one or more component nodes may be configurable using a dropdown menu, as shown by FIG. 8B, In particular, a dropdown menu 814 may contain preconfigured options for particular types of robots, axes of motion, IO types, and/or tools (e.g., that coincide with particular types of industrial robots). In some examples, one or more of robot node 806, tool nod 808, IO node 810, and/or axis node 812 may selected or configured using dropdown menu 814. In other examples, custom robots with custom arrangements of robot type, tools, IO, and/or axes may be designed and then saved for later use.

In further examples, a 3D model of a robotic device may be displayed corresponding to a particular digital robot actor. For example, as shown in FIG. 8C, a digital robot actor may be generated within input window 802 via stage node 804 corresponding to robot node 806, tool node 808, IO node 810, and axis node 812. Within a separate display window 814, a 3D model of a robotic device 816 corresponding to the digital robot actor may be displayed. Parameters of robotic device 816 may be determined based on configurations of robot node 806, tool node 808, IO node 810, and/or track node 812. In particular, the type of robotic device 816 may be determined based on robot node 806. Additionally, a spindle 818 may be shown as an end-effector-mounted tool on the robotic device 816 based on tool node 808. Accordingly, using display window 814, a user may be able to visualize how a configured robot actor will look within a physical workcell.

In additional examples, the digital nodes generated based on the node configuration data may include at least one motion command node. A motion command node may determine a sequence of robot motion commands for a particular robot actor in order to cause the robot actor to move along a received motion path. In some examples, a motion command node may take as input a robot node and a motion path. The motion command node may then determine motion commands for the robotic device corresponding to the robot node in order to cause the robotic device (or an end effector of the robotic device) to move along the motion path.

In some examples, a user may specify a motion path in Cartesian space (e.g., XYZ coordinates in the physical workcell). For instance, a user may draw a line within a display window indicating a path to be followed by a robotic device in further examples, the user may specify the position within the physical workcell for the end effector of the robotic device to move to (e.g., by specifying XYZ coordinates) as well as an angle of rotation with which to use an end-effector-mounted tool, such as a gripper (e.g., by specifying Euler angles). In some examples, a user may be assisted in determining motion paths based on generated mathematical models, as previously described.

Using the motion path, a motion command node may determine how to command a particular robot, by specifying the joint angles and/or changes in joint angles at each of the robot's joints. For example, a typical industrial robot has six joints: three in the wrist for rotation, and three at the shoulder and elbow for positioning the wrist in Cartesian space. Because the robot has six joints, it can position an end-effector-mounted tool at an arbitrary six degree-of-freedom Cartesian pose (XYZ position and 3 Euler angles), within some limitations. The translation from Cartesian space to joint angles is called inverse kinematics (IK). In some examples, a motion command node may be referred to as an IK command node that solves the inverse kinematics problem in order to determine motion commands for a particular robot. In further examples, the motion command node may take into account limitations and ranges of motion of different types of robotic devices in determining robot motion commands.

In further examples, a motion command node or IK command node may select from a number of different possible solutions to the inverse kinematics problem. In some examples, an IK command node may select a solution by evaluating a history of previous IK solutions to find solutions that provided desired results. In additional examples, a user may optionally specify particular aspects of a solution, such as whether the robot elbow should be positioned up or down, or the robot wrist should be positioned up or down.

In yet further examples, an IK command node may allow the user to choose whether determined robot motions will be point-to-point or linear. Point-to-point motions may allow a robot some degree of freedom in moving between interpolation points while maximizing speed and/or smoothness. Accordingly, point-to-point motions may be curvilinear by allowing a robot to rotate its joints in between interpolation points. In contrast, linear motion may be used to force a robot to move in straight lines in between interpolation points. In further examples, a separate parameter may be included to cause a control system to interpolate between motions continuously.

In additional examples, a user may be able to specify through the graphical interface an interval at which the motion command node determines robot motion commands for a given motion path. By selecting a smaller interval, greater precision in robot movements may be achieved, but at a greater cost of system resources. Accordingly, in some examples, a smaller interval may be chosen for more critical functions within a building process. In certain examples, the interval may be chosen using an interpolation slider, such that the interval changes for one or more motion command nodes based on the position of a graphical marker on a slider within the graphical interface. The interval may be selected in other ways in some examples as well.

In further examples, at least one tool command node may be generated based on the node configuration data. In particular, a tool command node may determine a sequence of tool commands in order to cause a robot actor to operate a tool according to the received sequence of tool actions. For instance, the user may specify through the graphical interface one or more points within a motion path where certain tool operations are to be performed (e.g., pick up a stick at one point and place the stick at a second point). A tool command node may then determine tool commands for a particular robot actor in order to make the robot actor perform those tool operations at the specified locations.

In some examples, a tool command node may take into account parameters describing the robot actor in order to determine particular commands for the robot actor to follow. For instance, a robot actor may be configured to receive certain types of input signals in order to activate end-effector-mounted tools. A tool command node may determine a sequence of digital or analog signals that will cause a particular robot actor to activate a particular physical tool in the specified manner at specified points within a motion path. In some examples, IO values describing an aspect of tool operation (e.g., a frequency of a spindle) may be specified within the sequence of tool actions. In such examples, a tool command node may determine tool commands that cause a particular robot actor to operate a tool with the specified IO values. For example, the tool command node may determine analog signals to command the robot actor to operate a spindle with particular specified frequencies at different points within a motion path. In another example, the tool command node may determine digital signals to command a robot actor to open and close a gripper at different points within a motion path. Depending on the types of robot actors, tools, and IO used within a physical workcell, other types of tool commands or signals to activate physical tools at particular points could be determined by tool command nodes as well.

As shown by block 708 of FIG. 7, method 700 may also involve providing instructions for the at least one robot actor to construct the output product. In particular, a robot actor may be controlled to move based on the sequence of robot motion commands determined by a motion command node. Additionally, the robot actor may be controlled to execute tool commands at particular points within the sequence of robot motion commands based on the sequence of tool commands determined by a tool command node. In some examples, a step sequencer may be provided in order to sequence together motion commands and tool commands before exporting the commands to a robot actor to execute within the physical workcell.

Figure 9:
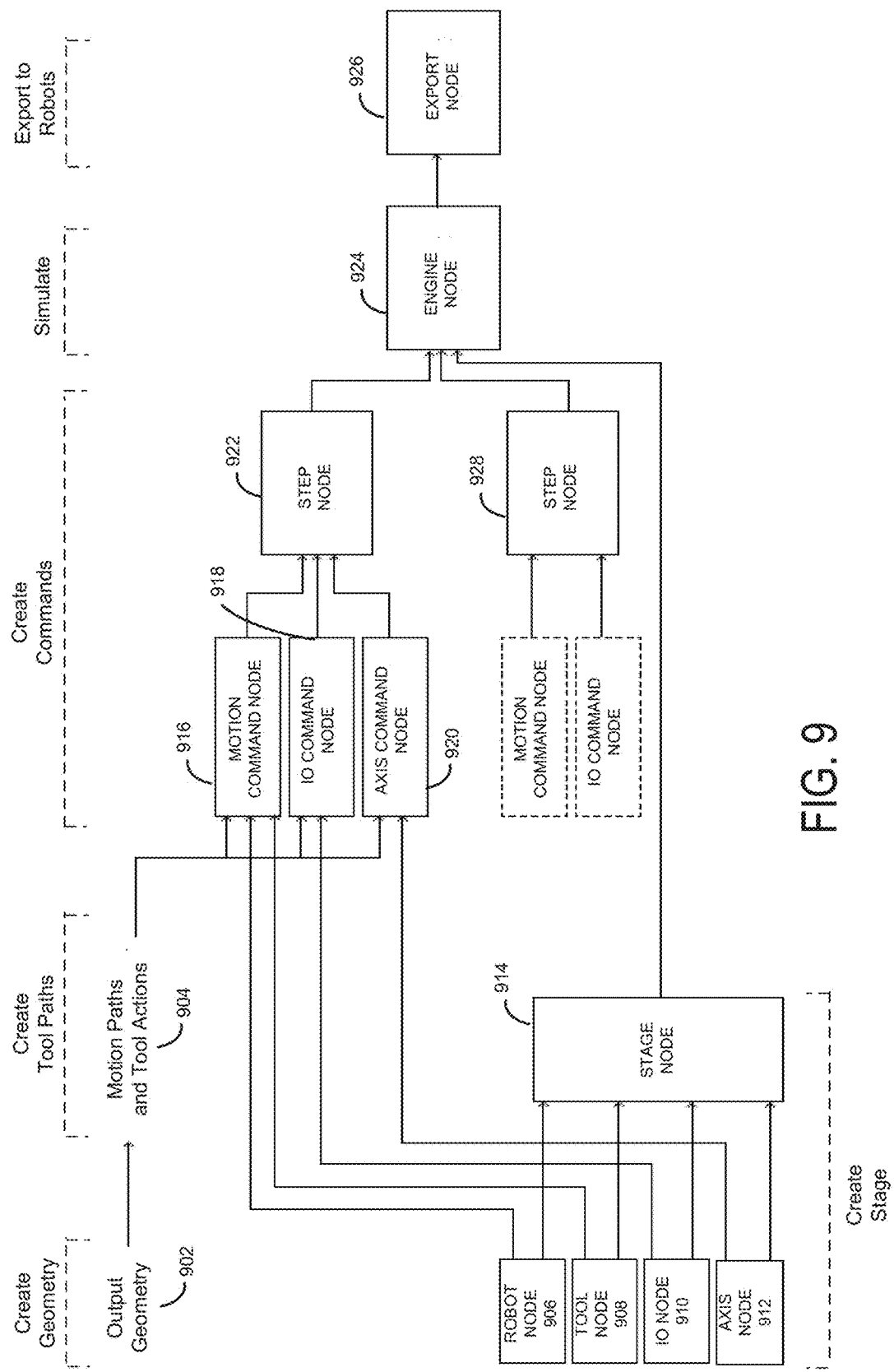
FIG. 9 is block diagram of an example node configuration, according to an example embodiment.

FIG. 9 is block diagram of an example node configuration, according to an example embodiment. In particular, FIG. 9 shows the generation of step nodes in order to sequence together robot motion commands and tool commands before exporting the commands to a robot actor. Output geometry 902 may first be determined describing a desired output product. As previously described, a user may then determine motion paths and tool actions 904 for a robot actor to use in construction of output product based on output geometry 902. The robot actor, including any relevant parameters of the robotic device, tools, IO, or tracks, may be described using robot node 906, tool node 908, IO node 910, and axis node 912. Each of these component nodes may be input into stage node 914, which may describe all of the available components within a particular physical workcell.

The motion paths and tool actions 904 may be input into a motion command node 916, along with robot node 906 and tool node 908. As described previously, motion command node 916 may determine a sequence of robot motion commands in order to cause a robotic device described by robot node 906 and tool node 908 to move its end-effector-mounted tool through the inputted motion paths 904. Additionally, the motion paths and tool actions 904 and IO node 910 may be input into a tool command node, or IO command node 918. IO command node 918 may determine a sequence of IO triggers to cause the robotic device described by robot node 906 to execute tool operations at certain points along the motion path of the tool based on the inputted motion paths and tool actions 904. In further examples, axis node 912 may be input into axis command node 920 in order to determine a sequence of axis commands to cause the robotic device described by robot node 906 to move along an axis within the physical workcell described by axis node 912. Note that in some examples, one or more robotic devices may be stationary within a physical workcell.

In additional examples, the output from motion command node 916, IO command node 918, and axis command node 920 may combined within a step node 922. In some examples, the step node 922 may interleave the sequence of robot motion commands and tool commands in order to create a step that defines a step of a building process within the physical workcell. For instance, a step may indicate how the robotic device corresponding to robot node 906 may perform a particular function within a modeling process, such as moving to a pile of sticks, picking up a stick, moving to a stick wall under construction, and placing the stick on the stick wall.

In further examples, a duplicate step node 928 may be generated within a graphical interface. For example, a user may be able to copy step node 922 in order to cause a robotic device to repeat particular operations or to cause a different robotic device to execute the operations. Accordingly, step nodes such as step node 922 may function as reusable building blocks within a graphical interface that may allow a user to design and configure more complex sequences of motion, possibly sequencing together a number of different steps before exporting to a robotic device for execution.

In further examples, output from the step node 922 and duplicate step node 928 may be input into engine node 924. Engine node 924 may compile multiple steps to be performed by one or more robotic actors, and may additionally provide visualization and/or simulation functionality. In additional examples, stage node 914 may be defined by a user, describing each of the robotic devices, tools, IO, and/or axes available within a particular physical workcell. For instance, a user may configure stage node 914 to indicate the devices and/or components currently available for a building process. Then, the engine node 924 may interface with the stage node 914 in order to determine particular robot actors (including robotic devices, tools, IO, and/or axes) to perform particular steps within the building process. In other examples, the stage node 914 may define other characteristics of a physical workcell as well, such as available sensors, materials for construction, or other hardware components.

Output from engine node 924 may be input to an export node 926, which may be used to send instructions to a robotic device within the physical workcell. Communication between a control system and a robotic device may be achieved using any of the methods previously described. In some examples, the export node 926 may allow a user to select a particular robotic device to cause to execute the determined step operations. In further examples, the export node 926 may contain a dropdown menu that allows for the selection of a robotic device from one or more robotic devices within a particular physical workcell.

In yet further examples, different steps may be simultaneously executed by multiple robotic devices within a single physical workcell. In some examples, a sync node may be used to connect two or more steps by indicating that commands from each of the step nodes should start at the same time. Accordingly, each of the robotic devices may be prevented from executing commands within one of the step nodes attached to a sync node until all of the robotic devices are available and ready to begin executing commands specified by corresponding step nodes. Robot operations may be synchronized between different robot actors in different ways as well.

In an alternative embodiment, data may be received through the graphical interface indicating at least one construction path for use by at least one robot actor. In particular, the construction path may include at least one sequence of robot operations, where at least some of the robot operations include use of a tool. For instance, a user may be able to specify both a motion path for a robot actor to follow as well as tool operations occurring along the motion path as a single construct. In one example, the user may be able to specify a construction path by drawing a line through a modeling environment with an "x" at particular points indicating tool operations, as illustrated and described with respect to FIG. 5.

Additionally, based on node configuration data, at least one command node may be generated in order to cause a robot actor to perform robot operations within the construction path. In particular, a single type of command node may determine both robot motion commands and tool commands in order to cause a particular robot actor corresponding to a robot node to perform operations within the construction path. For example, the command node may solve an inverse kinematics problem to determine particular robot joint angles or movements and also determine how to command the robot to perform particular tool actions at points within the received construction path. In some examples, the command node may also perform a sequencing function in order to sequence motion commands with tool commands into a single sequence of robot commands.

In further examples, one or more of the command nodes may be conditional command nodes. A conditional command node may determine robot operations for a particular robot actor to follow based on sensor data received from one or more sensors within a physical workcell. For instance, a conditional command node may contain a conditional statement that will cause a robotic actor to only use a piece in construction if it will fit within a certain area. Further, sensor data received during construction may indicate the shape of a particular piece. Based on the sensor data, the conditional command node may determine whether or not to output robot operations to pick up and use the particular piece during the building process. Other types of conditional command nodes are also possible.

Other variations on the disclosed systems and methods, including combining or dividing functions of digital nodes, are also possible.

VII. Conclusion

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information, such as a block of method 1100 described above, may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A computer-implemented method, comprising:
   causing, by one or more processors, a visual programming graphical interface to be displayed on a display device;
   receiving, by the one or more processors, node configuration data based on one or more user interactions with the visual programming graphical interface;
   generating, by the one or more processors and based on the node configuration data, a plurality of connectable digital node icons for display on the visual programming graphical interface, the plurality of connectable digital node icons comprising:
   (a) a robot node icon describing one or more attributes of a robot actor; and
   (b) a motion command node icon describing a motion path that was drawn by a user on the visual programming graphical interface;
   determining, by the one or more processors, that the user has connected the robot node icon to the motion command node icon within the visual programming graphical interface;
   generating, by the one or more processors, a sequence of robot motion commands to allow the robot actor having the one or more attributes described by the robot node icon to move along the motion path described by the motion command node icon that the user has connected to the robot node icon; and
   providing, by the one or more processors, the sequence of robot motion commands to the robot actor.

2. The method of claim 1, wherein the one or more attributes specify limitations on angles of motion of the robot actor, and the sequence of robot motion commands comprise a sequence of joint angles for the robot actor to cause an end effector of the robot actor to follow the motion path.

3. The method of claim 1, wherein the one or more attributes comprise a plurality of link lengths of the robot actor, wherein the plurality of link lengths are indicated by the node configuration data, and wherein the method further comprises determining the sequence of robot motion commands for allowing robot actors that are constrained by the link lengths to move along the motion path.

4. The method of claim 1, wherein the one or more attributes comprise constraints associated with a make and model of the robot actor, wherein constraints associated with the make and model are indicated by the node configuration data, and wherein the method further comprises determining the sequence of robot motion commands for allowing robot actors having the constraints to move along the motion path.

5. The method of claim 1, wherein the one or more attributes comprise one or more limitations on a range of motion of one or more joints of the robot actor, wherein the one or more limitations on the range of motion are indicated by the node configuration data, and wherein the method further comprises determining the sequence of robot motion commands for allowing robot actors having the one or more limitations to move along the motion path.

6. The method of claim 1, further comprising:
   receiving, via the graphical interface, one or more parameters describing characteristics of an output product to be constructed by the robot actor; and
   causing a graphical representation of the output product to be displayed within the graphical interface.

7. The method of claim 6, further comprising:
   determining at least one mathematical model describing the output product based on the one or more parameters; and
   determining the motion path based at least in part on the at least one mathematical model.

8. The method of claim 6, further comprising:
   determining at least one mathematical model describing the output product based on the one or more parameters; and
   determining an endpoint of the motion path based on the at least one mathematical model, wherein the endpoint comprises a target plane on the output product.

9. The method of claim 1, wherein the motion path comprises a sequence of frames, wherein a frame comprises a position and orientation of an end effector of the robot actor.

10. The method of claim 1, further comprising:
    displaying an interpolation slider with the graphical interface;
    receiving input data via the interpolation slider specifying an interval at which to interpolate robot motion commands for the motion path; and
    determining the sequence of robot motion commands using the specified interval.

11. The method of claim 1, further comprising generating, based on the node configuration data, at least one tool node icon, wherein the at least one tool node icon describes one or more characteristics of at least one tool operable by the robot actor.

12. The method of claim 1, further comprising generating, based on the node configuration data, at least one axis node icon, wherein the at least one axis node icon describes at least one track of motion indicating a track of motion through which the robot actor is configured to travel.

13. The method of claim 1, further comprising causing a visual simulation of construction of an output product by the robot actor to be displayed within the graphical interface.

14. A system comprising:
a display device; and
a one or more processors configured to:
  cause a visual programming graphical interface to be displayed on a display device;
  receive node configuration data based on one or more user interactions with the visual programming graphical interface;
  generate, based on the node configuration data, a plurality of connectable digital node icons for display on the visual programming graphical interface, the plurality of connectable digital node icons comprising:
    (a) a robot node icon describing one or more attributes of a robot actor; and
    (b) a motion command node icon describing a motion path that was drawn by a user on the visual programming graphical interface;
  determine that the user has connected the robot node icon to the motion command node icon within the visual programming graphical interface;
  generate a sequence of robot motion commands to allow the robot actor having the one or more attributes described by the robot node icon to move along the motion path described by the motion command node icon that the user has connected to the robot node icon; and
  provide the sequence of robot motion commands to the robot actor.

15. The system of claim 14, wherein the one or more attributes specify limitations on angles of motion of the robot actor, and the sequence of robot motion commands comprise a sequence of joint angles for the robot actor to cause an end effector of the robot actor to follow the motion path.

16. The system of claim 14, wherein the one or more attributes comprise a plurality of link lengths of the robot actor, wherein the plurality of link lengths are indicated by the node configuration data, and wherein the method further comprises determining the sequence of robot motion commands for allowing robot actors that are constrained by the link lengths to move along the motion path.

17. The system of claim 14, wherein the one or more attributes comprise constraints associated with a make and model of the robot actor, wherein constraints associated with the make and model are indicated by the node configuration data, and wherein the method further comprises determining the sequence of robot motion commands for allowing robot actors having the constraints to move along the motion path.

18. A non-transitory computer readable medium having stored therein instructions, that when executed by a computing system, cause the computing system to perform functions comprising:
  causing a visual programming graphical interface to be displayed on a display device;
  receiving node configuration data based on one or more user interactions with the visual programming graphical interface;
  generating, based on the node configuration data, a plurality of connectable digital node icons for display on the visual programming graphical interface, the plurality of connectable digital node icons comprising:
    (a) a robot node icon describing one or more attributes of a robot actor; and
    (b) a motion command node icon describing a motion path that was drawn by a user on the visual programming graphical interface;
  determining that the user has connected the robot node icon to the motion command node icon within the visual programming graphical interface;
  generating a sequence of robot motion commands to allow the robot actor having the one or more attributes described by the robot node icon to move along the motion path described by the motion command node icon that the user has connected to the robot node icon; and
  providing the sequence of robot motion commands to the robot actor.

19. The non-transitory computer readable medium of claim 18, wherein the one or more attributes specify limitations on angles of motion of the robot actor, and the sequence of robot motion commands comprise a sequence of joint angles for the robot actor to cause an end effector of the robot actor to follow the motion path.

20. The non-transitory computer readable medium of claim 18, wherein the one or more attributes comprise a plurality of link lengths of the robot actor, wherein the plurality of link lengths are indicated by the node configuration data, and wherein the method further comprises determining the sequence of robot motion commands for allowing robot actors that are constrained by the link lengths to move along the motion path.

* * * * *